US012809798B2

(12) United States Patent
Alameh et al.

(10) Patent No.: US 12,809,798 B2
(45) Date of Patent: Nov. 24, 2026

(54) SYSTEM AND METHOD FOR A CUSTOMIZABLE UNIVERSAL DIGITAL DOCKING INPUT PAD OPERATING AS A PLURALITY OF INPUT/OUTPUT (IO) DEVICES FOR A NEARBY INFORMATION HANDLING SYSTEM

(71) Applicant: Dell Products LP, Round Rock, TX (US)

(72) Inventors: Rachid M. Alameh, Crystal Lake, IL (US); Edward J. Yurchik, Jr., Algonquin, IL (US)

(73) Assignee: DELL PRODUCTS LP, Round Rock, TX (US)

( * ) Notice: Subject to any disclaimer, the term of this patent is extended or adjusted under 35 U.S.C. 154(b) by 122 days.

(21) Appl. No.: 19/039,605

(22) Filed: Jan. 28, 2025

(65) Prior Publication Data

US 2026/0220059 A1 Jul. 30, 2026

(51) Int. Cl.
*G06F 13/20* (2006.01)
*G06F 1/16* (2006.01)
*G06F 13/42* (2006.01)

(52) U.S. Cl.
CPC ............ *G06F 13/20* (2013.01); *G06F 1/1632* (2013.01); *G06F 13/4282* (2013.01); *G06F 2213/0016* (2013.01)

(58) Field of Classification Search
CPC ......... G06F 2213/0016; G06F 13/4282; G06F 13/20; G06F 1/1632
See application file for complete search history.

(56) References Cited

U.S. PATENT DOCUMENTS

| | | | | |
|---|---|---|---|---|
| 6,380,930 | B1 | 4/2002 | Van Ruymbeke | |
| 8,629,841 | B2 | 1/2014 | Degner | |
| 8,754,855 | B2 | 6/2014 | Duncan | |
| 9,274,660 | B2 | 3/2016 | Bernstein | |
| 9,280,248 | B2 | 3/2016 | Bernstein | |
| 9,400,582 | B2 | 7/2016 | Bernstein | |
| 9,535,557 | B2 | 1/2017 | Bernstein | |
| 9,829,982 | B2 | 11/2017 | Bernstein | |
| 2012/0225622 | A1* | 9/2012 | Kudrna ............... | H04M 1/0256 455/41.2 |
| 2012/0314347 | A1 | 12/2012 | Zhang | |

(Continued)

*Primary Examiner* — Phong H Dang

(74) *Attorney, Agent, or Firm* — Prol Intellectual Property Law, PLLC; H. Kenneth Prol

(57) ABSTRACT

A customizable universal digital docking input pad may comprise a proximity sensor to detect nearby presence of an information handling system, a short distance radio to establish a wireless link with the information handling system, a grid of pressure sensors to detect location of a solid object placed by the user on the customizable universal input pad as an input/output (IO) device, the short distance radio to transmit the solid object location to the information handling system and receive back a user-selected identification of an IO device type for the solid object, the pressure sensors to detect downward force upon or movement of the solid object with respect to the customizable universal input pad, and a microprocessor to execute machine readable code instructions to associate the downward force or movement with IO code instructions formatted for the IO device type and transmit the IO commands to the information handling system.

20 Claims, 11 Drawing Sheets

(56) References Cited

U.S. PATENT DOCUMENTS

| | | | | |
|---|---|---|---|---|
| 2013/0162515 | A1* | 6/2013 | Prociw | H04M 1/72409 361/679.09 |
| 2013/0178232 | A1* | 7/2013 | Claussen | H01Q 1/2216 455/456.2 |
| 2013/0285984 | A1* | 10/2013 | Degner | G06F 3/041 345/175 |
| 2016/0188048 | A1 | 6/2016 | Tan | |
| 2019/0129473 | A1* | 5/2019 | Hu | G06F 3/0412 |
| 2022/0209581 | A1 | 6/2022 | Kim | |
| 2022/0416559 | A1 | 12/2022 | Choi | |

* cited by examiner

SYSTEM AND METHOD FOR A CUSTOMIZABLE UNIVERSAL DIGITAL DOCKING INPUT PAD OPERATING AS A PLURALITY OF INPUT/OUTPUT (IO) DEVICES FOR A NEARBY INFORMATION HANDLING SYSTEM

FIELD OF THE DISCLOSURE

The present disclosure generally relates to wireless input/output (IO) devices for information handling systems and smart devices. The present disclosure more specifically relates to a customizable universal digital docking input pad for detecting presence of a solid object upon the customizable universal digital docking input pad, determining an IO device type (e.g., mouse, key, button, user's hand/finger, stylus) for the detected solid object, detecting downward force upon or movement of the solid object with respect to the customizable universal digital docking input pad, and transmitting an IO command of the determined IO device type to a paired information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
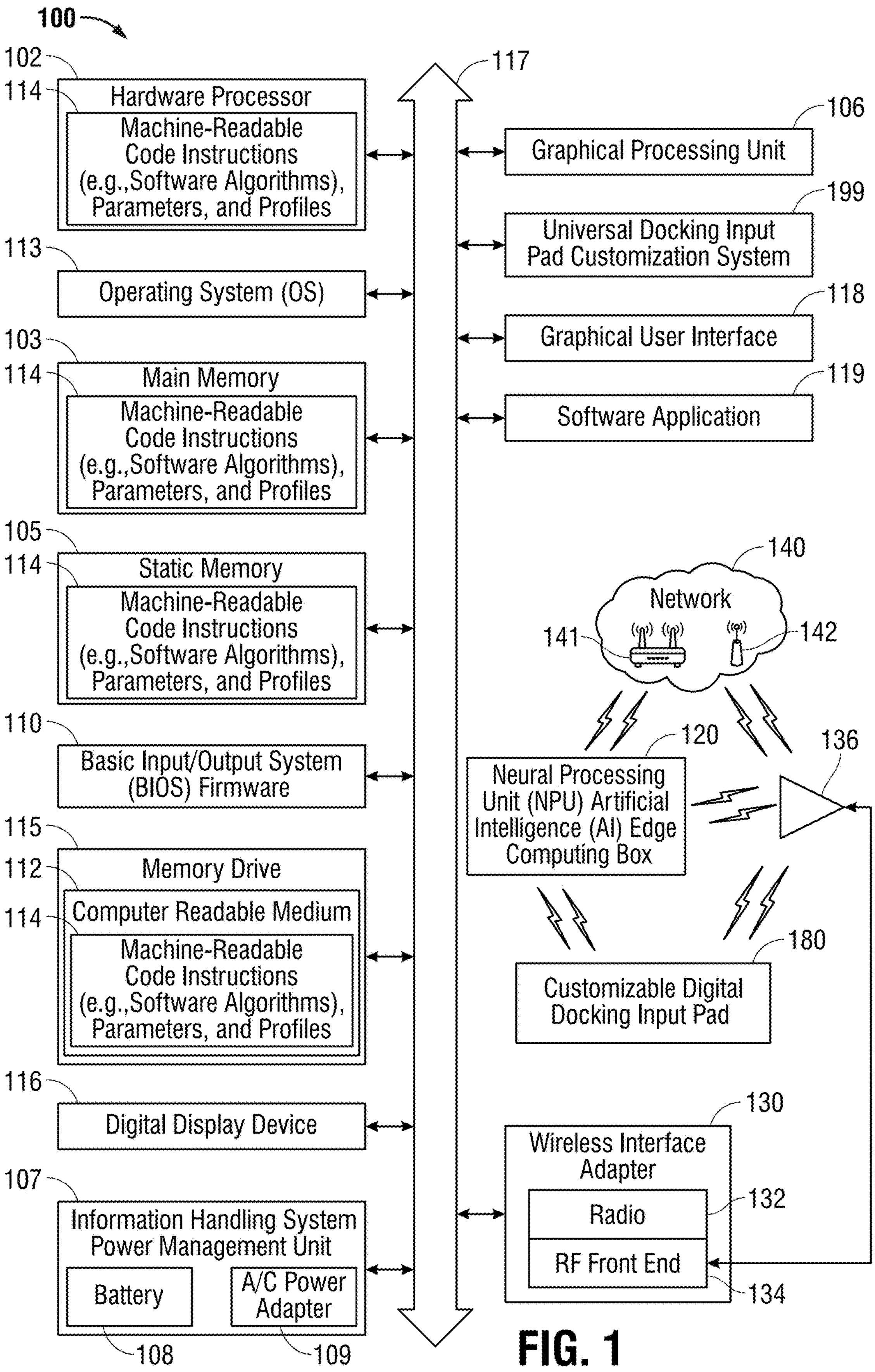
FIG. 1 is a block diagram illustrating an information handling system for determining an IO device type assigned to a solid object detected at an operably coupled customizable universal digital docking input pad according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Users of information handling systems desire information handling systems having compute resources that can easily and automatically scale to current usage demands and automatically pair with IO devices as they move among various workspaces, each including different ecosystems of IO devices. Further, users may wish to avoid having to manually customize sensitivity of newly added IO devices. The customizable universal digital docking input pad in combination with a neural processing unit (NPU) artificial intelligence (AI) edge computing box and information handling system may address these issues by automatically and wirelessly pairing with one another when proximity or contact between these devices is sensed, automatically determining presence of a solid object acting as an IO device placed upon the customizable universal digital docking input pad, determining a user-specified IO device type for the sensed solid object, and generating and transmitting to an information handling system user-customized input/output (IO) commands of the user-specified device type based on the detected movement of the solid object with respect to the customizable universal digital docking input pad.

The customizable universal digital docking input pad in embodiments of the present disclosure may comprise a thin, touch-sensitive pad for sensing through capacitive touch, resistive force, pressure sensors, or a combination to sense the placement, movement, or downward pressure on a solid object the user wishes to use as an IO device upon the customizable universal digital docking input pad. The solid object in embodiments herein may comprise a traditional IO device, such as a mouse, keyboard, or stylus, a portion of a user's hand, such as a finger or palm, or any type of object lacking computing powers, including, for example, a piece of wood acting as a mouse or plastic keys or buttons. The customizable universal digital docking input pad in embodiments herein may initially customize IO commands for the sensed solid object acting as an IO device in tandem with a wirelessly coupled information handling system and wireless coupled NPU AI edge computing box in various embodiments herein. The customizable universal digital docking input pad is also able to sense and recognize the formfactor of the items placed thereon, such as a phone, laptop information handling system, mouse, finger. That sensing comprises capacitive sensing among other possible inputs. A universal digital docking input pad customization system executing at an information handling system and a universal digital docking input pad customization system agent executing at the customizable universal digital docking input pad use that formfactor detection data to determine a type of IO device being used and tailor and optimize interface with such detected IO devices upon such recognition at the customizable universal digital docking input pad in embodiments herein.

In embodiments herein, the customizable universal digital docking input pad may wirelessly connect to an information handling system and an NPU AI edge computing box sensed by the customizable universal digital docking input pad or by the NPU AI edge computing box to be nearby and within range of short-distance radio of one another. For example, the NPU AI edge computing box may sense that the information handling system or customizable universal digital docking input pad is stacked above or beneath it respectively via a plurality of pressure or touch sensors or in the case of the latter, uses the customizable universal digital docking input pad capacitive or force sensing to do that without adding additional sensors. In another scenario, the customizable universal digital docking input pad may sense a location and form-factor shape or a solid object placed upon it and work in tandem with the information handling system to confirm, via the user, that the solid object is either the information handling system itself or the NPU AI edge computing box or other devices used in the system. In yet another case, the customizable universal digital docking input pad may sense the presence of the information handling system or NPU AI edge computing box placed nearby but not upon the customizable universal digital docking input pad by polling to or responding to polling from the information handling system or NPU AI edge computing box via short-range wireless link, such as a wireless link adhering to an inter-integrated circuit (I2C), inter-integrated circuit sound (I2S), near-field communication (NFC), Bluetooth® (BT), or BT low energy (BTLE) communication protocol.

Upon detection of and establishing of a short-range wireless link between and among the customizable universal digital docking input pad, the information handling system, and the NPU AI edge computing box in embodiments herein, one or more of these wireless couple devices may work in tandem with one another to customize IO commands for a sensed solid object placed upon the customizable universal digital docking input pad and acting as an IO device for the information handling system. For example, a hardware processor at the information handling system may execute machine readable code instructions of a universal input pad customization system to prompt the user, via a graphical user interface (GUI), to identify an IO device type for the sensed solid object, if not a default identified IO device. A wireless interface device of the information handling system may then transmit the user-selected IO device type or default IO device type to the customizable universal digital docking input pad for identifying the type of IO commands that should be generated pursuant to detected force or movement of the solid object.

A microprocessor at the customizable universal digital docking input pad may transmit IO commands for the user-specified or default IO device type associated with a detected touch or force of a solid object on the customizable universal digital docking input pad to the NPU AI edge computing box and to the information handling system, via short distance wireless links. For example, IO commands for a solid object acting as a mouse may be customized using a machine learning model to adjust the IO commands generated due to detected movement or pressure on the solid object acting as a mouse based on user hand speed, magnitude of force used, or rapidity of downward motions registering as mouse clicks. As another example, IO commands for a solid object acting as a stylus (e.g., a pencil or the user's finger) or keyboard key may be customized using the machine learning model to adjust the IO commands generated due to detected movement and level of pressure of the solid object to automatically for varied functions, such as placing generated text in bold or underline or highlight it with a different color, when a sufficient level of pressure is detected. A neural processing unit at the NPU AI edge computing box may input these received IO commands into a universal input pad user customization machine learning model trainer to train a machine learning model to customize generated IO commands to specific usage characteristics of the current user. The wireless interface adapter at the NPU AI edge computing box may then transmit the universal input pad user customization trained machine learning model to the customizable universal digital docking input pad for customization of future generated IO commands.

Upon identification of a solid object as a specific IO device type and, in some cases, training of a machine learning model to customize IO commands generated due to movement or pressure on that solid object with respect to the customizable universal digital docking input pad, movement or pressure placed on such a solid object and registered by the customizable universal digital docking input pad may be associated with IO commands specific to its IO device type. For example, a plurality of capacitive touch, resistive force, or pressure sensors of the customizable universal digital docking input pad in embodiments may detect such movement or pressure placed on a solid object acting as a user-specified or default IO device type. A microprocessor of the customizable universal digital docking input pad may execute machine readable code instructions of a universal input pad customization agent to associate this sensed movement or force with IO commands specific to the user-identified or default IO device type, and potentially customized based on usage characteristics of the current user. The short-range radio of the customizable universal digital docking input pad in embodiments may then transmit the identified IO commands to the information handling system for execution. In such a way, the customizable universal digital docking input pad in combination with the NPU AI edge computing box and information handling system may automatically and wirelessly pair with one another when proximity or touch between these devices is sensed, automatically determine presence of a solid object acting as an IO device placed upon the customizable universal digital docking input pad, determine a user-specified IO device type for the sensed solid object, and generate and transmit to an information handling system user-customized input/output (IO) commands of the user-specified or a default device type based on the detected movement of the solid object with respect to the customizable universal digital docking input pad.

Turning now to the figures, FIG. 1 illustrates an information handling system 100 similar to the information handling systems according to several aspects of the present disclosure. As described herein, an information handling system 100 may work in tandem with a customizable universal digital docking input pad 180 and a neural processing unit (NPU) artificial intelligence (AI) edge computing box 120 to determine a user-specified or default IO device type for a solid object placed on the customizable universal digital docking input pad 180 operatively coupled to the information handling system 100. The customizable universal digital docking input pad 180 may wirelessly connect to the information handling system 100 and an NPU AI edge computing box 120 sensed by the customizable universal digital docking input pad 180 or by the NPU AI edge computing box 120 to be nearby and within range of short-distance radio of one another, such as via a wireless link adhering to an inter-integrated circuit (I2C), inter-integrated circuit sound (I2S), near-field communication (NFC), Bluetooth® (BT), or BT low energy (BTLE) communication protocol. The customizable universal digital docking input pad 180 may trigger a wireless coupling to the information handling system 100 and an NPU AI edge computing box 120 when contact is sensed by the customizable universal digital docking input pad 180 in another embodiment.

Upon detection of and establishing of a short-range wireless link between and among the customizable universal digital docking input pad 180, the information handling system 100, and the NPU AI edge computing box 120 in an embodiment, one or more of these wireless coupled devices 100, 120, and 180 may work in tandem with one another to customize IO commands for a sensed solid object placed upon the customizable universal digital docking input pad 180 and acting as an IO device for the information handling system 100. In embodiments herein, the NPU AI edge computing box 120 serves to support the information handling system 100 on top with enhanced NPU compute capabilities. Further, the NPU AI edge computing box 120 supports the customizable universal digital docking input pad 180 below with NPU enabled customization for the specific user. The NPU AI edge computing box 120 also contains storage for storing and transferring data upon placement of the information handling system 100 on top and stores customization profiles enabled for the user of the customizable universal digital docking input pad 180. A hardware processor 102 at the information handling system 100 in an embodiment may execute machine readable code instructions 114 of a universal input pad customization system 199 to prompt a user, via a graphical user interface (GUI) 118 on the information handling system digital display 116, to identify or confirm placement of the NPU AI edge computing box 120 or the information handling system 100 on the customizable universal digital docking input pad 120. In an embodiment, the hardware processor 102 at the information handling system may also execute machine readable code instructions 114 of a universal input pad customization system 199 to display to the user via the GUI 118, open or free space on the customizable universal digital docking input pad 120 that the user may dedicate toward a drawing/touch canvas area or toward placement of a solid object as an identified IO device for the information handling system 100.

The hardware processor may execute machine readable code instructions 114 of the universal input pad customization system 199 to prompt the user, via the GUI 116, to identify an IO device type for the sensed solid object as an IO device, if not a default identified IO device such as the user's hand or finger. In some embodiments, information handling system 100 may receive from the customizable universal input pad 180 a form factor shape of the solid object acting as an IO device, also referred to as an input device in some aspects. In such an embodiment, the hardware processor 102 may execute machine readable code instructions 114 of the universal input pad customization system 199 to suggest an IO device type, such as a keyboard, mouse, or stylus, for example, for the solid object based on the received form factor shape. The wireless interface device 130 may then transmit a user-selected IO device type or default IO device type to the customizable universal digital docking input pad 180 for identifying the type of IO commands that should be generated pursuant to detected force or movement of the solid object. The customizable universal digital docking input pad 180 in an embodiment may then transmit the determined IO command to the information handling system 100, based on detected future movement or pressure upon the solid object acting as the IO device for processing via the hardware processor 102 of the information handling system 100, such as to allow the user to interact with a software application 119.

In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 141, a base station transceiver 142, a wireless telephone, a control system, a camera, a scanner, a printer, a personal trusted device, a smart appliance, an IOT sensor, a vehicle, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of computer readable code instructions to perform one or more computer functions, via one or more hardware processing resources.

The information handling system 100 may include main memory 103, (volatile (e.g., random-access memory, etc.), or static memory 105, nonvolatile (read-only memory, flash memory etc.) or any combination thereof), one or more hardware processing resources, such as a hardware processor 102 that may be a central processing unit (CPU), a graphics processing unit (GPU) 106, other hardware controllers, or any combination thereof. Additional components of the information handling system 100 may include one or more storage devices such as static memory 105 or drive unit 115. The information handling system 100 may include or interface with one or more communications ports for communicating with external devices, as well as an input/output (IO) device, a video/graphics digital display device 116, or any combination thereof. Portions of an information handling system 100 may themselves be considered information handling systems 100.

Information handling system 100 may include devices or modules that embody one or more of the hardware devices or hardware processing resources executing machine readable code instructions for one or more systems and modules. The information handling system 100 may execute machine readable code instructions (e.g., software or firmware algorithms), parameters, and profiles 114 that may operate on servers or systems, remote data centers, or on-box in individual client information handling systems according to various embodiments herein. In some embodiments, it is understood that any or all portions of machine readable code instructions (e.g., software or firmware algorithms), parameters, and profiles 114 may operate on a plurality of information handling systems 100.

The information handling system 100 may include the hardware processor 102 such as a central processing unit (CPU) or other hardware processing resources. Any of the hardware processing resources may operate to execute machine readable code instructions 114 that are either firmware or software code. Moreover, the information handling system 100 may include memory such as main memory 103, static memory 105, and disk drive unit 115 (volatile (e.g., random-access memory, etc.), nonvolatile memory (read-only memory, flash memory etc.) or any combination thereof or other memory with computer readable medium 112 storing machine readable code instructions (e.g., software or firmware algorithms), parameters, and profiles 114 executable by the hardware processor 102, GPU 106, or any other hardware processing device. The information handling system 100 may also include one or more buses 117 operable to transmit communications between the various hardware components such as any combination of various I/O devices 116, as well as between hardware processors 102, GPU 106 or other, the operating system (OS) 113, the basic input/output system (BIOS) 110, the wireless interface adapter 130, or a radio module 132, among other components described herein.

A network interface device of the information handling system 100 may be wired or wireless such as shown with wireless interface adapter 130 that can provide wireless connectivity among devices such as with Bluetooth® or to a network 140, e.g., a wide area network (WAN), a local area network (LAN), wireless local area network (WLAN), a wireless personal area network (WPAN), a wireless wide area network (WWAN), a virtual private network (VPN) or other network. In embodiments described herein, the wireless interface device 130 with its radio 132, RF front end 134 and antenna 136 is used to communicate with the network 140 and with the wearable 3D IO and authenticator device 160, via, for example, a Bluetooth® or Bluetooth® Low Energy (BLE) protocols, or other WPAN or WLAN protocols.

In an embodiment, a WAN, WWAN, LAN, and WLAN may each include an AP 141 or base station 142 used to operatively couple the information handling system 100 to a network 140 or the wearable 3D IO and authenticator device 160 via a wireless interface adapter 130. In a specific embodiment, the network 140 may include macro-cellular connections via one or more base stations 142 or a wireless AP 141 (e.g., Wi-Fi), or such as through licensed or unlicensed WWAN small cell base stations 142. Connectivity may be via wired or wireless connection. For example, the wearable 3D IO and authenticator device 160, wireless network wireless APs 141 or base stations 142 may be operatively connected to the information handling system 100. Wireless interface adapter 130 may include one or more radio frequency (RF) subsystems (e.g., radio 132) with transmitter/receiver circuitry, modem circuitry, one or more antenna RF front end circuits 134, one or more wireless controller circuits, amplifiers, antennas 136 and other circuitry of the radio 132 such as one or more antenna ports used for wireless communications via multiple radio access technologies (RATs). The radio 132 may communicate with one or more wireless technology protocols.

In an embodiment, the wireless interface adapter 130 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WiMAX, WWAN such as 3GPP or 3GPP2, Bluetooth® standards, proprietary RF protocol, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax/be including Wi-Fi 6, Wi-Fi 6e, and the emerging Wi-Fi 7 standard. It is understood that any number of available channels may be available in WLAN under the 2.4 GHz, 5 GHz, or 6 GHz bands which may be shared communication frequency bands with WWAN protocols or Bluetooth® protocols in some embodiments. Wireless interface adapter 130 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both licensed and unlicensed spectrums. The wireless interface adapter 130 can represent an add-in card, wireless network interface module that is integrated with a main board of the information handling system 100 or integrated with another wireless network interface capability, or any combination thereof.

In some embodiments, one or more hardware processors or hardware controllers executing software, firmware, or dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software machine readable code instructions executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a computer-readable medium that includes computer-readable code instructions, parameters, and profiles 114 or receives and executes instructions, parameters, and profiles 114 responsive to a propagated signal, so that a hardware device connected to a network 140 may communicate voice, video, or data over the network 140. Further, the machine readable code instructions 114 may be transmitted or received over the network 140 via the network interface device or wireless interface adapter 130.

The information handling system 100 may include a set of instructions 114 that may be executed to cause the computer system to perform any one or more of the methods or computer-based functions disclosed herein. For example, machine readable code instructions 114 may be executed by a hardware processor 102, GPU 106, or any other hardware processing resource and may include software agents, or other aspects or components used to execute the methods and systems described herein. Various software modules comprising application machine readable code instructions 114 may be coordinated by an OS 113, and/or via an application programming interface (API) include a unified device API described herein. An example OS 113 may include Windows®, Android®, and other OS types. Example APIs may include Win 32, Core Java API, or Android APIs.

In an embodiment, the information handling system 100 may include a disk drive unit 115. The disk drive unit 115 and may include machine-readable code instructions, parameters, and profiles 114 in which one or more sets of machine-readable code instructions, parameters, and profiles 114, such as firmware or software can be embedded to be executed by the hardware processor 102 or other hardware processing devices such as a GPU 106, or other microcontroller unit to perform the processes described herein. Similarly, main memory 103 and static memory 105 may also contain a computer-readable medium for storage of one or more sets of machine-readable code instructions, parameters, or profiles 114 described herein. The disk drive unit 115 or static memory 105 also contain space for data storage. Further, the machine-readable code instructions, parameters, and profiles 114 may embody one or more of the methods as described herein. In a particular embodiment, the machine-readable code instructions, parameters, and profiles 114 may reside completely, or at least partially, within the main memory 103, the static memory 105, and/or within the disk drive 115 during execution by the hardware processor 102, or GPU 106 of information handling system 100.

Main memory 103 or other memory of the embodiments described herein may contain computer-readable medium (not shown), such as RAM in an example embodiment. An example of main memory 103 includes random access memory (RAM) such as static RAM (SRAM), dynamic RAM (DRAM), non-volatile RAM (NV-RAM), or the like, read only memory (ROM), another type of memory, or a combination thereof. Static memory 105 may contain computer-readable medium (not shown), such as NOR or NAND flash memory in some example embodiments. The applications and associated APIs, for example, may be stored in static memory 105 or on the disk drive unit 115 that may include access to a machine-readable code instructions, parameters, and profiles 114, such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 107 (a.k.a. a power supply unit (PSU)). The PMU 107 may include a hardware controller and executable machine-readable code instructions to manage the power provided to the components of the information handling system 100 such as the hardware processor 102 and other hardware components described herein. The PMU 107 may control power to one or more components including the one or more drive units 115, the hardware processor 102 (e.g., CPU), the GPU 106, the digital display device 116, or other components that may require power when a power button has been actuated by a user. In an embodiment, the PMU 107 may monitor power levels and be electrically coupled to the information handling system 100 to provide this power. The PMU 107 may be coupled to the bus 117 to provide or receive data or machine-readable code instructions or IO commands. The PMU 107 may regulate power from a power source such as the battery 108 or AC power adapter 109. In an embodiment, the battery 108 may be charged via the AC power adapter 109 and provide power to the components of the information handling system 100, via wired connections as applicable, or when AC power from the AC power adapter 109 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 112 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a standalone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system 100. The system, device, controller, or module can also include a combination of the foregoing examples of hardware or hardware executing software or firmware. Note that an information handling system 100 can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
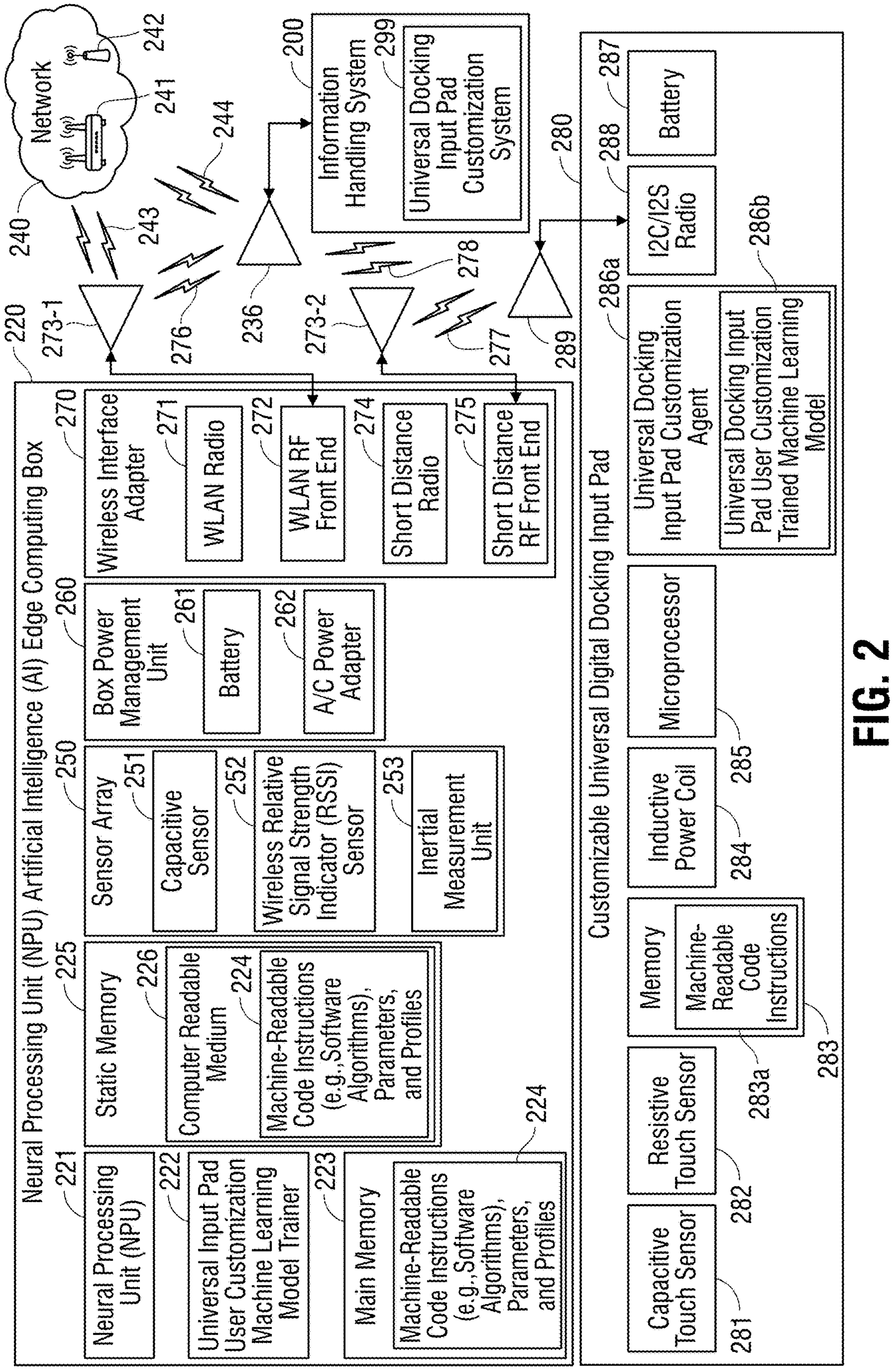
FIG. 2 is a block diagram illustrating a customizable universal digital docking input pad operatively coupled to a neural processing unit (NPU) artificial intelligence (AI) edge computing box and an information handling system according to an embodiment of the present disclosure.

FIG. 2 is a block diagram illustrating a customizable universal digital docking input pad operatively coupled to a neural processing unit (NPU) artificial intelligence (AI) edge computing box for customizing input/output (IO) commands generated by the customizable universal digital docking input pad to usage characteristics for a current user according to an embodiment of the present disclosure. As described herein, a customizable universal digital docking input pad 280 in combination with an NPU AI edge computing box 220 and information handling system 200 may automatically and wirelessly pair with one another when proximity or contact between these devices 200, 220, and 280 is sensed, automatically determine presence of a solid object acting as an IO device placed upon the customizable universal digital docking input pad 280, determine a user-specified IO device type for the sensed solid object if not a default IO device, and generate and transmit to an information handling system 200 user-customized input/output (IO) commands of the user-specified input or IO device type based on the detected movement of the solid object with respect to the customizable universal digital docking input pad 280.

The customizable universal digital docking input pad 280 in an embodiment may comprise a thin, touch-sensitive pad for sensing through capacitive touch, resistive force, pressure sensors, or a combination of the same, the placement, movement, or downward pressure on a solid object the user wishes to use as an IO device upon the customizable universal digital docking input pad 280. For example, the customizable universal digital docking input pad 280 in an embodiment may operate as a capacitive touch pad with a plurality of capacitive touch sensors 281. As another example, the customizable universal digital docking input pad 280 may comprise a grid of resistive touch sensors or pressure sensors 282 to sense downward pressure on the customizable universal digital docking input pad 280 at a plurality of grid-crossing locations, as shown with respect to FIG. 3, below.

In an embodiment, the customizable universal digital docking input pad 280 may wirelessly connect to an information handling system 200 and an NPU AI edge computing box 220 sensed by the customizable universal digital docking input pad 280 or by the NPU AI edge computing box 220 to be in contact with or nearby and within range of short-distance radio of one another. For example, the NPU AI edge computing box 220 may sense that the information handling system 200 or customizable universal digital docking input pad 280 is stacked above or beneath it via one or more pressure sensors 253 sensing downward force from the weight of the information handling system 200 upon the NPU AI edge computing box 220 or the weight of the NPU AI edge computing box 220 on the customizable universal digital docking input pad 280. In another example embodiment, a capacitive sensor 251 may sense the presence of the information handling system 200 or the customizable universal digital docking input pad 280 nearby the NPU AI edge computing box 220. In still another example embodiment, a wireless relative signal strength indicator (RSSI) sensor 252 may determine that the information handling system 200 or the customizable universal digital docking input pad 280 is located within a short distance of the NPU AI edge computing box 220 based on the strength of a wireless communication signal emitted from those devices 200 and 280. In an embodiment, the customizable universal digital docking input pad 280 may sense the presence of the information handling system 200 or NPU AI edge computing box 220 in contact upon the customizable universal digital docking input pad 280 to trigger polling to or responding to polling from the information handling system 200 or NPU AI edge computing box 220 via short-range radio 288. In other embodiments, the customizable universal digital docking input pad 280 may sense the presence of the information handling system 200 or NPU AI edge computing box 220 placed nearby via short range wireless sensing such as capacitive sensing, RSSI distance, or NFC communication range with, but not located upon the customizable universal digital docking input pad 280 by polling to or responding to polling from the information handling system 200 or NPU AI edge computing box 220 via short-range radio 288.

The wireless interface adapter 270 of the NPU AI edge computing box 220 in an embodiment may establish a direct wireless link 276 with antenna 273-1 to information handling system 200 at antenna 236, or an indirect link via wireless link 243 to network 240 and wireless link 244 to information handling system 200 at antenna 236 via a wide local area network (WLAN) radio 271, WLAN radio frequency (RF) front end 272, and antenna 273-1. In an embodiment, the NPU AI edge computing box 220 may be used to communicate with the information handling system 200, via, for example, a Bluetooth® or Bluetooth® Low Energy (BLE) protocols, or other WPAN or WLAN protocols. The NPU AI edge computing box 220 may include one or more radio frequency (RF) subsystems (e.g., WLAN radio 272 or short distance radio 274) with transmitter/receiver circuitry, modem circuitry, one or more antenna RF front end circuits, such as WLAN RF front end 273 or short distance RF front end 275, one or more wireless controller circuits, amplifiers, antennas 273-1 and 273-2 and other circuitry of the wireless interface adapter 270 such as one or more antenna ports used for wireless communications via multiple radio access technologies (RATs). The radios 272 and 274 may communicate with one or more wireless technology protocols.

The NPU AI edge computing box 220 in an embodiment may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WiMAX, WWAN such as 3GPP or 3GPP 2, Bluetooth® standards, proprietary RF protocol, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax/be including Wi-Fi 6, Wi-Fi 6e, and the emerging Wi-Fi 7 standard. It is understood that any number of available channels may be available in WLAN under the 2.4 GHz, 5 GHz, or 6 GHz bands which may be shared communication frequency bands with WWAN protocols or Bluetooth® protocols in some embodiments. The NPU AI edge computing box 220 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both licensed and unlicensed spectrums.

The short range radio 288 of the customizable universal digital docking input pad 280 in an embodiment may establish a wireless link 277 to the NPU AI edge computing box 220, or a wireless link 278 to the information handling system 200 via antenna 289. In an embodiment, the customizable universal digital docking input pad 280 may be used to communicate with the information handling system 200 or the NPU AI edge computing box 220, via, for example, a Bluetooth® or Bluetooth® Low Energy (BLE) protocols, or other WPAN or WLAN protocols, such as inter-integrated circuit (I2C), inter-integrated circuit sound (I2S) or near field communications (NFC) communications protocols. The radio 288 may communicate with one or more wireless technology protocols.

The customizable universal digital docking input pad 280 in an embodiment may operate in accordance with any short-range wireless data communication standards. The short-range wireless data communication allows the customizable universal digital docking input pad 280 to work in standalone mode when in proximity with the NPU box or the information handling system or both but not in contact. In such an embodiment, a source power, such as a battery or an A/C power source is needed for the customizable universal digital docking input pad 280. To communicate with a wireless local area network, standards including IEEE 802.11 WLAN standards (e.g., IEEE 802.11ax-2021 (Wi-Fi 6E, 6 GHz)), IEEE 802.15 WPAN standards, WiMAX, Bluetooth® standards, proprietary RF protocol, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax/be including Wi-Fi 6, Wi-Fi 6e, and the emerging Wi-Fi 7 standard. It is understood that any number of available channels may be available in WLAN under the 2.4 GHz, 5 GHz, or 6 GHz bands which may be shared communication frequency bands with WWAN protocols or Bluetooth® protocols in some embodiments.

The customizable universal digital docking input pad 280 may include a hardware microprocessor 285 for executing machine-readable code instructions 283*a*, such as machine readable code instructions for the universal docking input pad customization agent 286*a* or the universal docking input pad user customization trained machine learning model 286*b*, as stored within a memory 283. In an embodiment, the customizable universal digital docking input pad 280 may include the hardware microprocessor 285 or other hardware processing resources on the customizable universal digital docking input pad 280. Any of the hardware processing resources may operate to execute machine readable code instructions 283*a* that are either firmware or software code, such as machine readable code instructions 293*a* for the universal docking input pad customization agent 286*a* or universal docking input pad user customization trained machine learning model 286*b*. The customizable universal digital docking input pad 280 may include a set of instructions 283*a* that may be executed to cause the customizable universal digital docking input pad 280, in coordination with an operatively coupled information handling system 200, NPU AI edge computing box 220 or other smart devices in wireless communication, to perform any one or more of the methods or computer-based functions disclosed herein. For example, machine readable code instructions 283*a* may be executed by a hardware microprocessor 285 or any other hardware processing resource and may include software agents, or other aspects or components used to execute the methods and systems described herein.

Moreover, the customizable universal digital docking input pad 280 may include memory 283, such as volatile (e.g., random-access memory, etc.), nonvolatile memory (read-only memory, flash memory etc.) or any combination thereof or other memory with computer readable medium storing machine readable code instructions (e.g., software or firmware algorithms), parameters, and profiles 283*a* executable by the hardware microprocessor 285 or any other hardware processing device to perform the processes described herein. Memory 285 or other memory of the embodiments described herein may contain computer-readable medium, such as RAM in an example embodiment. In an embodiment, memory 285 may contain computer-readable medium, such as NOR or NAND flash memory in some example embodiments. Another example of memory 285 includes random access memory (RAM) such as static RAM (SRAM), dynamic RAM (DRAM), non-volatile RAM (NV-RAM), or the like, as well as read only memory (ROM), another type of memory, or a combination thereof in other embodiments herein.

In an embodiment, the customizable universal digital docking input pad 280 may further include a battery 287, which may be charged via a contactless inductive charging coil 284 embedded within the customizable universal digital docking input pad 280, for placement beneath the NPU AI edge computing box 220 or an information handing system 200 in various embodiments, when placed in a stacked configuration. The battery 287 may control power to one or more components including the hardware microprocessor 285, radio 288, antenna 289, and other components that may require power when sensing solid objects placed on the customizable universal digital docking input pad 280, such as sensors 281 or 282.

The NPU AI edge computing box 220 may include a neural processing unit (NPU) 221 for executing machine-readable code instructions 224, such as machine readable code instructions for the universal docking input pad user customization machine learning model trainer 222, as stored within a main memory 223 or static memory 225. In an embodiment, the NPU AI edge computing box 220 may include the NPU 221 or other hardware processing resources on the NPU AI edge computing box 220. Any of the hardware processing resources may operate to execute machine readable code instructions 224 that are either firmware or software code, such as machine readable code instructions 224 for the universal docking input pad user customization machine learning model trainer 222. The NPU AI edge computing box 220 may include a set of instructions 224 that may be executed to cause the NPU AI edge computing box 220, in coordination with an operatively coupled information handling system 200, customizable universal digital docking input pad 280 or other smart devices in wireless communication, to perform any one or more of the methods or computer-based functions disclosed herein. For example, machine readable code instructions 224 may be executed by an NPU 221 or any other hardware processing resource and may include software agents, or other aspects or components used to execute the methods and systems described herein.

Moreover, the NPU AI edge computing box 220 may include main memory 223, or static memory 225 such as volatile (e.g., random-access memory, etc.), nonvolatile memory (read-only memory, flash memory etc.) or any combination thereof or other memory with computer readable medium storing machine readable code instructions (e.g., software or firmware algorithms), parameters, and profiles 224 executable by the NPU 221 or any other hardware processing device to perform the processes described herein. Memory 223 or static memory 225 or other memory of the embodiments described herein may contain computer-readable medium 226, such as RAM in an example embodiment. In an embodiment, main memory 223 or static memory 225 may contain computer-readable medium 226, such as NOR or NAND flash memory in some example embodiments. Another example of main memory 223 or static memory 225 includes random access memory (RAM) such as static RAM (SRAM), dynamic RAM (DRAM), non-volatile RAM (NV-RAM), or the like, as well as read only memory (ROM), another type of memory, or a combination thereof in other embodiments herein.

In an embodiment, the NPU AI edge computing box 220 may further include a box power management unit (PMU) 260 (a.k.a. a power supply unit (PSU)). The box PMU 260 may include a hardware controller and executable machine-readable code instructions to manage the power provided to the components of the NPU AI edge computing box 220 such as the NPU 221 and other hardware components described herein. The box PMU 260 may control power to one or more components including the one or more drive units 225, the NPU 221, sensor array 250, wireless interface adapter 270, or other components that may require power when a power button has been actuated by a user. In an embodiment, the box PMU 260 may monitor power levels and be electrically coupled to the NPU AI edge computing box 220 to provide this power. The box PMU 260 may regulate power from a power source such as the battery 261 or AC power adapter 262. In an embodiment, the battery 261 may be charged via the AC power adapter 262 and provide power to the components of the NPU AI edge computing box 220, via wired connections as applicable, or when AC power from the AC power adapter 262 is removed. Power from the battery 261 or AC power adapter 262 may be wireless transferred to the customizable universal digital docking input pad 280 via inductive coil 284, via control of box PMU 260, when the NPU AI edge computing box 220 is placed atop and in direct contact with the customizable universal digital docking input pad 280 in a stacked configuration. It is contemplated in some embodiments that the information handling system 200 placed in contact on the customizable universal digital docking input pad 280 may also wireless charge the customizable universal digital docking input pad 280 via an inductive power coil 284 under the interface surface if the information handling system 200 has an inductive charging capability built into its bottom chassis.

Upon detection of and establishing of short-range wireless links 276, 277, and 278 between and among the customizable universal digital docking input pad 280, the information handling system 200, and the NPU AI edge computing box 220 in an embodiment, one or more of these wirelessly coupled devices 200, 220, and 280 may work in tandem with one another to customize IO commands for a sensed solid object, hand, finger, key, button, or solid object such as a pencil or stylus or information handling system 200 or UPU AI edge computing box 220, placed upon the customizable universal digital docking input pad 280 and acting as an IO device for the information handling system 200. The user in an embodiment may apply touch or force to a drawing/touch canvas area of the customizable universal digital docking input pad 280 using hand, finger, key, button, or solid object such as a pencil or stylus to provide input for the information handling system 200. The customizable universal digital docking input pad 280 in an embodiment may sense pressure of a solid object, such as via capacitive touch sensor 281 or a grid of resistive force sensors 282 and transmit a location or shape of the solid object to the information handling system 200, via the short distance wireless link 277.

As described in greater detail in embodiments herein, a hardware processor at the information handling system 200 may execute machine readable code instructions of a universal input pad customization system 299 to prompt the user, via a graphical user interface (GUI), to identify an IO device type for the sensed solid object, if not a default identified IO device. For example, the IO device type may be a keyboard, a mouse, button, or a stylus. The solid object itself may include other information handling systems 200, such as a smart phone or laptop type information handling system or solid objects lacking computing abilities, such as a user's hand or fingers, keyboard keys or buttons, or even a block of wood, if the user wishes to use such an object for providing input as an IO device to the information handling system 200. The hardware processor at the information handling system 200 may execute machine readable code instructions of the universal input pad customization system 299 to prompt the user, via the GUI, to identify an IO device type for the sensed solid object, if not a default identified IO device, such as a portion of a user's hand. In some embodiments, the hardware processor at the information handling system 200 may execute machine readable code instructions of the universal input pad customization system 299 to suggest an IO device type for the solid object based upon a received form factor, such as a detected shape or weight force, of the IO device indicating it has a particular shape common to a specific IO device such as a mouse, stylus, or keyboard. Upon the user selecting or confirming the IO device type for the detected solid object to operate as an IO device, the information handling system 200 may transmit the user-selected IO device type or default IO device type to the customizable universal digital docking input pad 280 for identifying the type of IO commands that should be generated pursuant to detected force or movement of the solid object.

A microprocessor 285 at the customizable universal digital docking input pad 280 in an embodiment may transmit IO commands for the user-specified or default IO device type associated with a detected touch or force of a solid object on the customizable universal digital docking input pad 280 to the NPU AI edge computing box 220 or to the information handling system 200, via short distance wireless links 277 and 278, respectively. An NPU 221 at the NPU AI edge computing box 220 in an embodiment may input the received IO commands into a universal input pad user customization machine learning model trainer 222 to train a machine learning model **286*b* to customize generated IO commands to specific usage characteristics of the current user. For example, IO commands for a solid object acting as a mouse may be customized using a machine learning model 286*b* to adjust the IO commands generated due to detected movement or pressure on the solid object acting as a mouse based on user hand speed, magnitude of force used, or rapidity of downward motions registering as mouse clicks. As another example, IO commands for a solid object acting as a stylus (e.g., a pencil or the user's finger) or keyboard key may be customized using the machine learning model 286*b* to adjust the IO commands generated due to detected movement and level of pressure of the solid object to automatically place generated text in bold when a sufficient level of pressure is detected. The wireless interface adapter 270 at the NPU AI edge computing box 220 may then transmit the universal input pad user customization trained machine learning model 286*b* to the customizable universal digital docking input pad 280 via wireless link 277** for customization of future generated IO commands.

Upon identification of a solid object as a specific IO device type and, in some cases, training of a machine learning model **286*b* to customize IO commands generated due to movement or pressure on that solid object with respect to the customizable universal digital docking input pad 280, movement or pressure placed on such a solid object and registered by the customizable universal digital docking input pad 280 may be associated with IO commands specific to its IO device type. For example, a plurality of capacitive touch 281, resistive force 282, or pressure sensors of the customizable universal digital docking input pad 280 in an embodiment may detect such movement or pressure placed on a solid object acting as a user-specified or default IO device type. A microprocessor 285 of the customizable universal digital docking input pad 280 may execute machine readable code instructions of a universal input pad customization agent 286*a* to associate this sensed movement or force with IO commands specific to the user-identified or default IO device type, and potentially customized based on usage characteristics of the current user. More specifically, in some embodiments in which the user-selected IO device type is associated with a machine learning model 286*b* at the customizable universal digital docking input pad 280, the microprocessor 285 at the customizable universal digital docking input pad 280 may execute machine readable code instructions 286*a* to input the detected force or movement of the solid object into the universal input pad user customization trained machine learning model 286*b*** to associate the sensed force or movement of the solid object with a user-customized IO command for the identified IO device.

The short-range radio 288 of the customizable universal digital docking input pad 280 in an embodiment may then transmit the identified IO commands to the information handling system 200 for execution. In embodiments herein, the identified IO commands for the information handling system 200 may then be used for the identified or default IO device at the customizable universal digital docking input pad 280 in future uses even if the NPU AI edge computing box 220 is not present or wirelessly coupled. In such a way, the customizable universal digital docking input pad 280 and information handling system 200 may automatically and wirelessly pair with one another with or without the NPU AI edge computing box 220 when proximity or contact between these devices 200 and 280 and in some embodiments 220 is sensed, and automatically determine presence of a solid object acting as an IO device placed upon the customizable universal digital docking input pad 280 for determination of a user-specified IO device type or a default IO device type for the sensed solid object, and generate and transmit to an information handling system 200 user-customized input/output (IO) commands of the user-specified or a default IO device type based on the detected movement of the solid object with respect to the customizable universal digital docking input pad 280.

Figure 3:
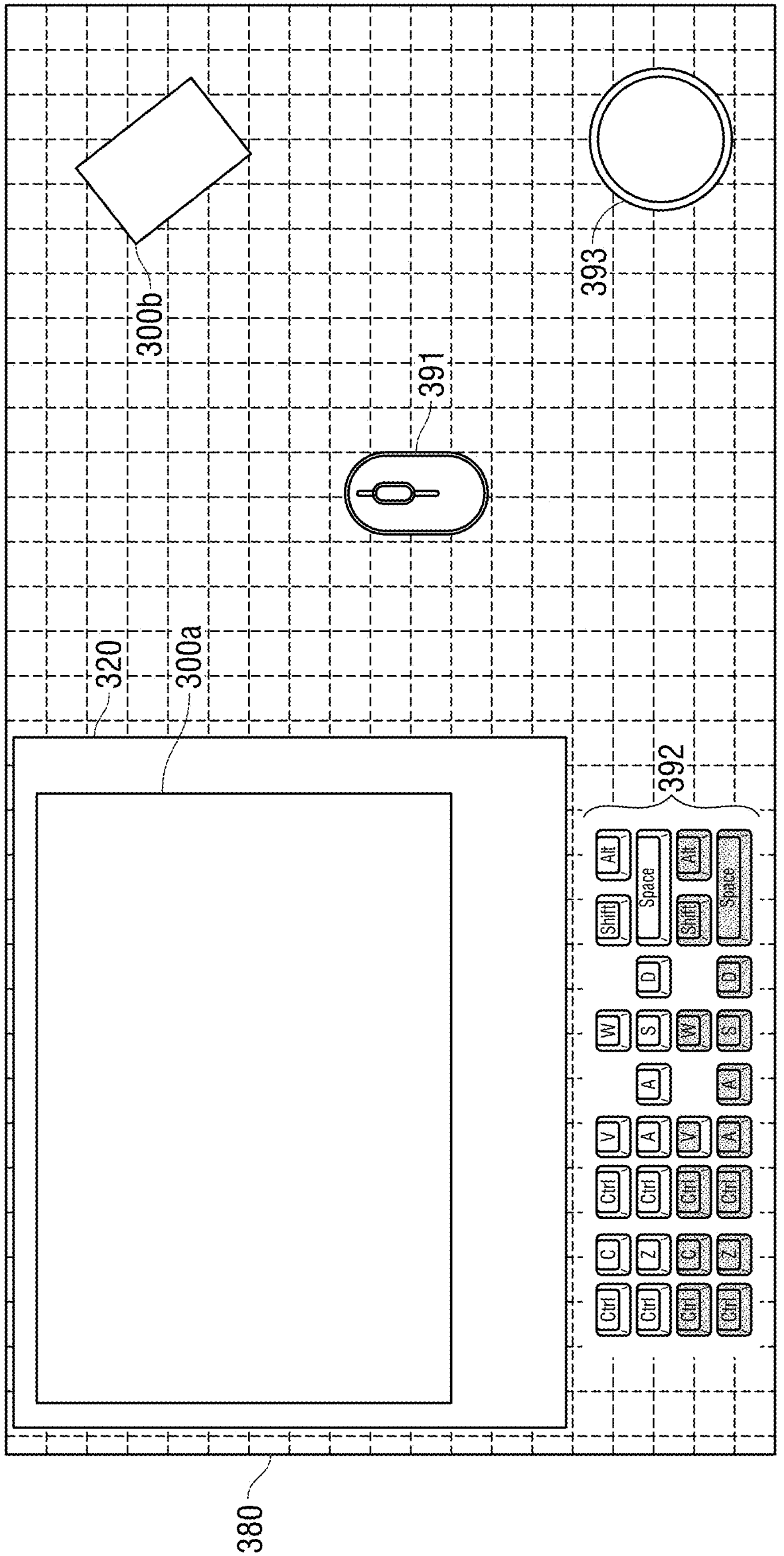
FIG. 3 is a graphical diagram illustrating a top view of a plurality of solid objects acting as IO devices for an information handling system placed upon a customizable universal digital docking input pad operatively coupled to the information handling system according to an embodiment of the present disclosure.

FIG. 3 is a graphical diagram illustrating a top view of a customizable universal digital docking input pad operatively coupled to a neural processing unit (NPU) artificial intelligence (AI) edge computing box and an information handling system and detecting a plurality of solid objects acting as IO devices for the information handling system placed upon the customizable universal digital docking input pad according to an embodiment of the present disclosure. A user may place an information handling system 300*a*, a customizable universal digital docking input pad 380 and neural processing unit (NPU) artificial intelligence (AI) edge computing box 320 within short-range proximity of or in contact with one another in an embodiment in a stacked configuration, as shown in FIG. 3. For example, the NPU AI edge computing box 320 may sense that the information handling system 300*a* or customizable universal digital docking input pad 380 is stacked above or beneath it via one or more pressure sensors sensing downward force from the weight of the information handling system 300*a* upon the NPU AI edge computing box 320 or the weight of the NPU AI edge computing box 320 detected on the customizable universal digital docking input pad 380. In other embodiments, only the information handling system 300*a* operates with the customizable universal digital docking input pad 380 with the weight of the information handling system 300*a* detected on the customizable universal digital docking input pad 380. In yet other embodiments, only the NPU AI edge computing box 320 is in contact with the customizable universal digital docking input pad 380 with the weight of the NPU AI edge computing box 320 detected on the customizable universal digital docking input pad 380 and the information handling system 300*a* sensed within a short-range proximity and operating with a wireless link with the customizable universal digital docking input pad 380. Other IO devices that are computing devices may also be sensed when in contact with the customizable universal digital docking input pad 380 or sensed within short-range proximity of the customizable universal digital docking input pad 380 such as a standalone display monitor (not shown), or another information handling system 300*b* such as a smartphone a tablet computing device, or an all-in-on computer in embodiments herein.

The customizable universal digital docking input pad 380 in an embodiment may comprise a thin, touch-sensitive pad for sensing, through capacitive touch, resistive force with force sensitive resistor (FSR) sensing, a type of sensing that is both capacitive to detect touch and pressure resistive sensitive to detect force/pressure, pressure sensors, or a combination of the same. This touch sensitive or force sensitive grid of any of the above sensors in the pad interface of the customizable universal digital docking input pad 380 detects the placement, movement, or downward pressure on a solid object, such as keyboard keys 393, mouse 391, or button 393 that the user wishes to use as an IO device upon the customizable universal digital docking input pad 380. For example, the customizable universal digital docking input pad 380 in an embodiment may a capacitive touch pad with a plurality of capacitive touch sensors. As another example, the customizable universal digital docking input pad 380 may comprise a grid of resistive touch sensors or pressure sensors located at the grid crossings shown in FIG. 3 to sense downward pressure on the customizable universal digital docking input pad 380.

In an embodiment, the customizable universal digital docking input pad 380 may wirelessly connect to an information handling system 300*a* and an NPU AI edge computing box 320 sensed by the customizable universal digital docking input pad 380 or by the NPU AI edge computing box 320 to be stacked on top of the customizable universal digital docking input pad 380. Upon detection of and establishing of such short-range wireless links between and among the customizable universal digital docking input pad 380, the information handling system 300*a*, and the NPU AI edge computing box 320 in an embodiment, one or more of these wirelessly coupled devices 300*a*, 320, and 380 may work in tandem with one another to customize IO commands for a sensed solid object 391, 392, or 393 placed upon the customizable universal digital docking input pad 380 and acting as an IO device for the information handling system 300*a*. The user in an embodiment may apply touch or force to the customizable universal digital docking input pad 380 using hand, finger, or solid object such as a pencil or stylus to provide input for the information handling system 300*a*. The customizable universal digital docking input pad 380 in an embodiment may sense pressure of a solid object 391, 392, or 393, information handling systems 300*a* or 300*b* (e.g., smart phone), or NPU AI edge computing box 320, and transmit a location or shape of the solid object to the information handling system 300*a*.

The information handling system 300*a* (e.g., a laptop computer) may prompt the user, via a graphical user interface (GUI), to identify an IO device type for the sensed solid object 391, 392, 393, 300*a*, 320, or 300*b*, if not a default identified IO device. For example, the IO device type may be a keyboard 392, a mouse 391, or a stylus. The solid object itself may include other information handling systems, such as a smart phone 300*b*, or solid objects lacking computing abilities, such as a user's hand or fingers, or even a block of wood, if the user wishes to use such an object for providing input to the information handling system 300*a*. The information handling system 300*a* in an embodiment may prompt the user, via a graphical user interface (GUI) on the information handling system 300*a* digital display, to identify or confirm placement of the NPU AI edge computing box 320 or the information handling systems 300*a* or 300*b* on the customizable universal digital docking input pad 380. This may allow the information handling system to further identify an area in which other solid objects may be placed upon the customizable universal digital docking input pad 380 as an IO devices for the information handling system 300*a*. A hardware processor at the information handling system 300*a* in an embodiment may execute machine readable code instructions of universal docking input pad customization system to display to the user, via the GUI, open or free space on the customizable universal digital docking input pad 380 that the user may dedicate toward a drawing/touch canvas area or toward placement of a solid object 391, 392, or 393 as an identified IO device. By recognizing the type of object placed on customizable universal digital docking input pad 380, the customizable universal digital docking input pad 380 layout may be seamlessly changed to control that object, such as switching between a full keypad when a laptop information handling system to a smaller keypad when a phone or other device with simple controls is detected as the solid object.

Upon placement of such a solid object 391, 392, or 393 within such identified free space or canvas area, the hardware processor at the information handling system 300*a* may execute machine readable code instructions of the universal input pad customization system to prompt the user, via the GUI, to identify an IO device type for the sensed solid object, if not a default identified IO device, such as a portion of a user's hand. In some embodiments, the hardware processor at the information handling system 300*a* may execute machine readable code instructions of the universal input pad customization system to suggest an IO device type for the solid object, such as 391, 392, or 393 based upon a received form factor of the IO device indicating it has a particular shape common to a specific IO device such as a mouse 391, stylus, or keyboard 392. Upon the user selecting or confirming the IO device type for the detected solid object 391, 392, or 393, the information handling system 300*a* may transmit the user-selected IO device type or default IO device type to the customizable universal digital docking input pad 380 for identifying the type of IO commands that should be generated pursuant to detected force or movement of the solid object 391, 392, or 393, for example.

The user may then apply touch or force to a drawing/touch canvas area of the customizable universal digital docking input pad 380 using a hand, finger, or solid object such as a pencil or stylus, mouse 391, keyboard 392, or button 393 to provide input for the information handling system 300*a*. In one example embodiment, a custom touch input keypad or keyboard enabled by the customizable universal digital docking input pad 380 itself without adding solid object keys of keyboard 392 with customization of one or more touch areas for the touch input keypad or keyboard for the fingers of the user. Such customization of this one or others may be customized by the universal docking input pad customization system operating at the information handling system 100 or the NPU AI edge computing box and provided to the customizable universal digital docking input pad 380. In an embodiment in which the user-selected IO device type associated with the solid object 391, 392, or 393 undergoing downward force or movement is not associated with a machine learning model at the customizable universal digital docking input pad 380, a microprocessor at the customizable universal digital docking input pad 380 may execute machine readable code instructions of a universal input pad customization agent to associate a sensed force or movement of the solid object 391, 392, or 393 with an IO command for the identified IO device based solely on the IO device type received from the information handling system 300*a* for that solid object 391, 392, or 393. The microprocessor at the customizable universal digital docking input pad 380 in an embodiment in which the user-selected IO device type associated with the solid object 391, 392, or 393 undergoing downward force or movement is associated with a machine learning model may input the sensed downward force or movement measurements into the machine learning model to generate IO commands customized to the usage characteristics of the current user and tailored to the user-specified or default IO device type received from the information handling system 300*a*. The customizable universal digital docking input pad 380 in an embodiment may then transmit the determined IO command to the information handling system 300*a* for processing via the hardware processor of the information handling system 300*a*.

Figure 4:
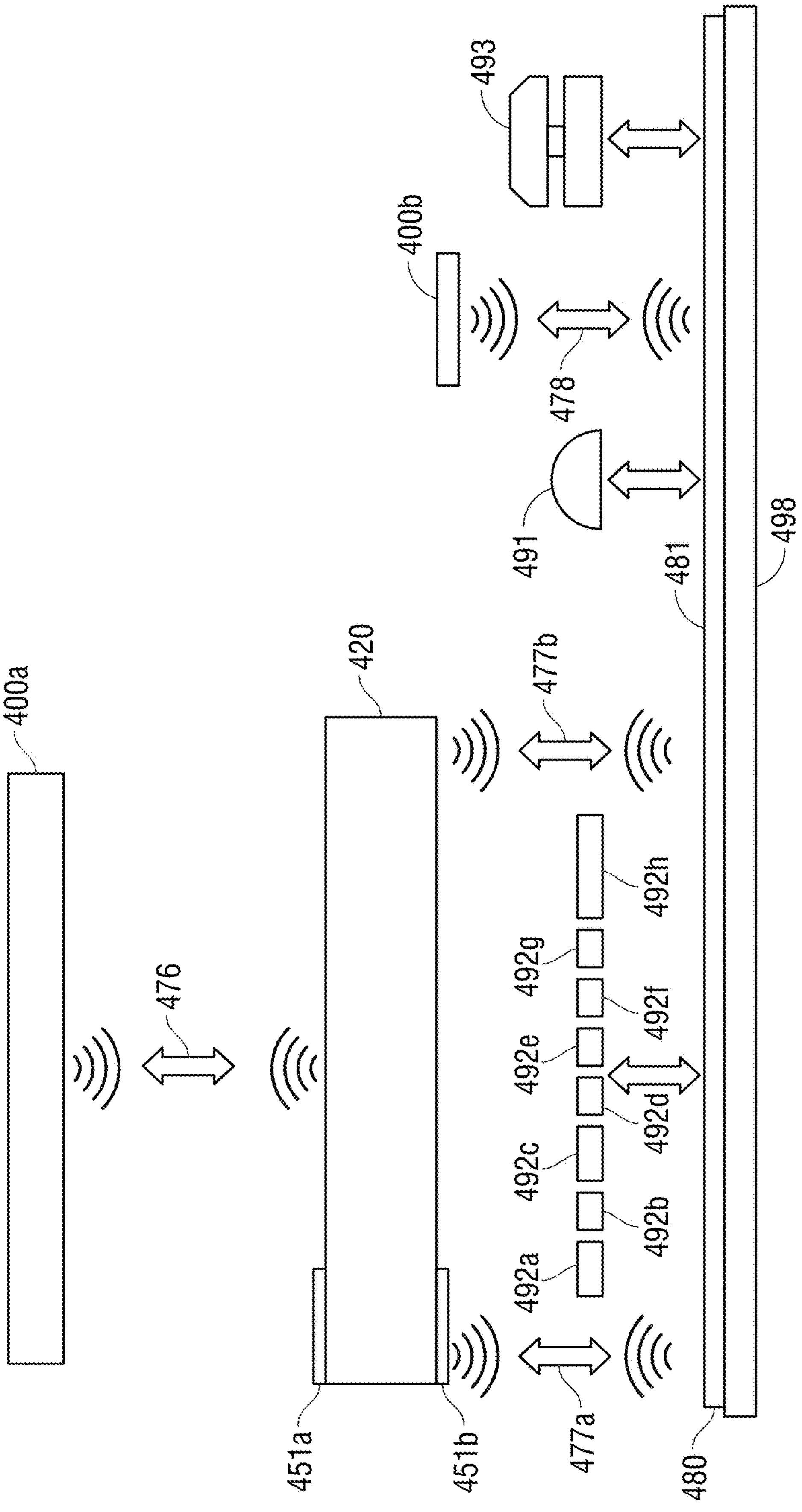
FIG. 4 is a graphical diagram illustrating a side view of a plurality of information handling systems and an NPU AI edge computing box situated in a stacked configuration on a wirelessly coupled customizable universal digital docking input pad according to an embodiment of the present disclosure.

FIG. 4 is a graphical diagram illustrating a side view of a plurality of information handling systems and a neural processing unit (NPU) artificial intelligence (AI) edge computing box situated in a stacked configuration on a wirelessly coupled customizable universal digital docking input pad to receive input/output (IO) commands for a plurality of solid objects sensed atop the customizable universal digital docking input pad according to an embodiment of the present disclosure. A user may place an information handling system 400, a customizable universal digital docking input pad 480 and neural processing unit (NPU) artificial intelligence (AI) edge computing box 420 within proximity of one another in an embodiment in a stacked configuration, as shown in FIG. 4. For example, the NPU AI edge computing box 420 may sense that the information handling system 400 or customizable universal digital docking input pad 480 is stacked above or beneath it respectively via one or more pressure sensors 453*a* and 453*b* sensing downward force from the weight of the information handling system 400*a* upon the NPU AI edge computing box 420 or the weight of the NPU AI edge computing box 420 on the customizable universal digital docking input pad 480, respectively. In one embodiment, sensor 453*b* may be enabled by the capacitive or resistive grid sensor of the customizable universal digital docking input pad 480. Further, in other embodiments, the customizable universal digital docking input pad 480 may sense contact by the NPU AI edge computing box 420 or the information handling system 400 via a capacitive, resistive, or other force sensor on the interface surface 481 of the customizable universal digital docking input pad 480. In an embodiment, the customizable universal digital docking input pad 480 may rest on a working surface 498, such as a table top or desk, with the interface surface 481 facing upward to engage the force sensors therein with one or more solid objects according to embodiments herein.

The customizable universal digital docking input pad 480 in an embodiment may sense placement, movement, or downward pressure on a solid object, such as one or more individual keyboard keys 492*a*, 492*b*, 492*c*, 493*d*, 494*e*, 494*f*, 494*g*, or 494*h*, mouse 491, or button 493 that the user wishes to use as an IO device upon the customizable universal digital docking input pad 480. For example, the customizable universal digital docking input pad 480 in an embodiment may be a capacitive touch pad with a plurality of capacitive touch sensors that can sense movement of components interior to buttons such as 493 or keyboard keys 492*a*, 492*b*, 492*c*, 493*d*, 494*e*, 494*f*, 494*g*, or 494*h* as those components move closer to or make greater contact with as well as when those components are moved further away on the interface surface 481 of the customizable universal digital docking input pad 480.

In an embodiment, the customizable universal digital docking input pad 480 may wirelessly connect to an information handling system 400*a*, such as via wireless links 477*b* or 477*c*, and an NPU AI edge computing box 420, such as via wireless link 477*a*, by the customizable universal digital docking input pad 480 or by the NPU AI edge computing box 420 being sensed as stacked on top of the customizable universal digital docking input pad 480. Although wireless link 477*b* and 477*c* are shown as passing through the NPU AI edge computing box 420, wireless link 477*b* may be in direct wireless coupling between the information handling system 400*a* and the customizable universal digital docking input pad 480 in other embodiments. Wireless link 477*c* is established between the information handling system 400*a* and the NPU AI edge computing box 420 in embodiments herein. Upon detection of and establishing of such short-range wireless links 477*a*, 477*b*, and 477*c* between and among the customizable universal digital docking input pad 480, the information handling system 400*a*, and the NPU AI edge computing box 420 in an embodiment, one or more of these wirelessly coupled devices 400*a*, 420, and 480 may work in tandem with one another to customize IO commands for a sensed solid object 492*a-h*, 491, or 493 placed upon the customizable universal digital docking input pad 480 and acting as an IO device for the information handling system 400*a*. The user in an embodiment may apply touch or force to the customizable universal digital docking input pad 480 using hand, finger, or solid object such as a pencil or stylus to provide input for the information handling system 400*a*. The customizable universal digital docking input pad 480 in an embodiment may sense pressure of a solid object 491, 492*a-h*, or 493, information handling systems 400*a* or 400*b* (e.g., smart phone), or NPU AI edge computing box 420, and transmit a location or shape of the solid object to the information handling system 400*a*.

The information handling system 300*a* (e.g., laptop computer) may prompt the user, via a graphical user interface (GUI), to identify an IO device type for the sensed solid object 491, 492*a-h*, 394, if not a default identified IO device. For example, the IO device type may be a keyboard key 492*a-h*, a mouse 491, or a stylus. Upon placement of such a solid object 491, 492*a-h*, or 493 on the customizable universal digital docking input pad 480, the hardware processor at the information handling system 400*a* may execute machine readable code instructions of the universal input pad customization system to prompt the user, via the GUI, to identify an IO device type for the sensed solid object, if not a default identified IO device such as a portion of a user's hand or fingers. In some embodiments, the hardware processor at the information handling system 300*a* may execute machine readable code instructions of the universal input pad customization system to suggest an IO device type for the solid object, such as 391, 392, or 393 based upon a received form factor of the solid object detected to be the IO device indicating it has a particular shape common to a specific IO device such as a plurality of keyboard keys 492*a-h* placed nearby one another or in a standard typing configuration. In such a case, the user may indicate, via the GUI, the specific letter, character, or function each key 492*a-h* of the keyboard is intended to communicate. Upon the user selecting or confirming the IO device type for the detected solid object 491, 492*a-h*, or 493, the information handling system 400*a* may transmit the user-selected IO device type or default IO device type to the customizable universal digital docking input pad 480 for identifying the type of IO commands that should be generated pursuant to detected force or movement of the solid object 491, 492*a-h*, or 493, for example.

The user may then apply touch or force to a drawing/touch canvas area of the customizable universal digital docking input pad 480 using a hand, finger, or other solid object such as a pencil or stylus, mouse 491, keyboard keys 492*a-h*, or button 493 to provide input for the information handling system 400*a*. A microprocessor at the customizable universal digital docking input pad 480 may execute machine readable code instructions of a universal input pad customization agent, and adjustments by a trained machine learning model, to associate and tune a sensed force or movement of the hand, finger, or other solid object 491, 492*a-h*, or 493 with an IO command for the identified IO device tailored to the user-specified or default IO device type received from the information handling system 400*a* and potentially customized to the usage characteristics of the current user. The customizable universal digital docking input pad 480 in an embodiment may then transmit the determined IO command, as tuned if available by the trained machine learning model, to the information handling system 400*a* for processing via the hardware processor of the information handling system 400*a*.

Figure 5:
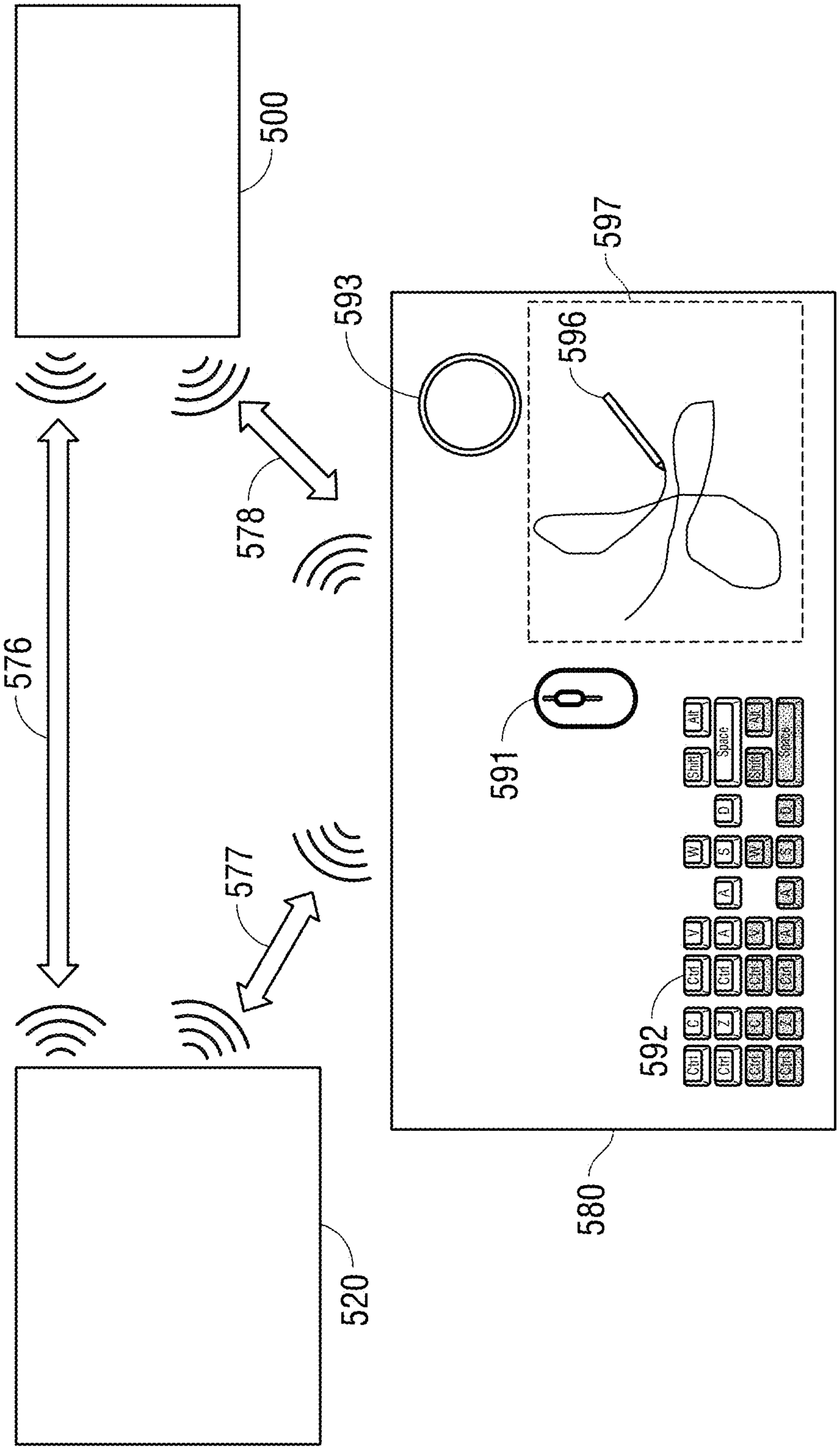
FIG. 5 is a graphical diagram illustrating a top view of a plurality of an information handling system and an NPU AI edge computing box placed nearby a wirelessly coupled customizable universal digital docking input pad according to an embodiment of the present disclosure.

FIG. 5 is a graphical diagram illustrating a top view of a plurality of information handling systems and a neural processing unit (NPU) artificial intelligence (AI) edge computing box situated proximate to a wirelessly coupled customizable universal digital docking input pad to receive input/output (IO) commands for a plurality of solid objects sensed within a user-specified drawing or canvas area of the customizable universal digital docking input pad according to an embodiment of the present disclosure. As described herein, the customizable universal digital docking input pad 580 may wirelessly connect to an information handling system 580 and an NPU AI edge computing box 520 sensed by the customizable universal digital docking input pad 580 or by the NPU AI edge computing box 520 to be within a capacitive sensor detectable range or other short range detecting sensor range nearby as well as within wireless range of short-distance radio of one another. For example, as described in greater detail above with respect to FIGS. 3 and 4, the NPU AI edge computing box 520 may sense that the information handling system 500 or customizable universal digital docking input pad 580 is stacked above or beneath it via a plurality of pressure sensors detecting contact. In another embodiment scenario, such as shown in FIG. 5, the customizable universal digital docking input pad 580 may have a remote proximity detector, such as the capacitive array in the interface surface or another proximity sensor (IR, sonic, ultrasonic, or other), sense that the information handling system 500 or NPU AI edge computing box 520 are nearby and within a detectable proximity range, though not currently placed on the customizable universal digital docking input pad 500. In another embodiment, a radiofrequency short proximity range may be detected via an RSSI range detector or NFC detector via one or more wireless interface adapters between the customizable universal digital docking input pad 580 and the information handling system 500 or NPU AI edge computing box 520.

For example, the customizable universal digital docking input pad 580 may sense the presence of the information handling system 500 or NPU AI edge computing box 520 placed nearby but not upon the customizable universal digital docking input pad 580 by polling to or responding to polling from the information handling system 500 or NPU AI edge computing box 520 via short-range wireless link 577 or 578, such as a wireless link adhering to an inter-integrated circuit (I2C), inter-integrated circuit sound (I2S), near-field communication (NFC), Bluetooth® (BT), or BT low energy (BTLE) communication protocol. RSSI levels may be used to set such a range for wireless coupling between the customizable universal digital docking input pad 580 and the information handling system 500 or NPU AI edge computing box 520. In another example, a plurality of capacitive sensors disposed across the interface surface of the customizable universal digital docking input pad 580 in an embodiment may simultaneously collect capacitive range data to form a combined, high sensitivity capacitive sensor to detect the nearby information handling system 500*a* or NPU AI edge computing box 520 by comparing capacitive measurements among these sensors and determine presence the nearby information handling system 500*a* or NPU AI edge computing box 520 including a general shape or size of the same to trigger establishing a short-range wireless link 577 or 578.

In an embodiment, the customizable universal digital docking input pad 580 can be designed as flexible/rollable pad for stowing and transport and may wirelessly connect to an information handling system 500 via wireless link 578 and an NPU AI edge computing box 520 via wireless link 577, as sensed by the customizable universal digital docking input pad 580 to be in proximity range of the customizable universal digital docking input pad 580. Upon detection of and establishing of such short-range wireless links 577 and 578 between and among the customizable universal digital docking input pad 580 and the information handling system 500 or the NPU AI edge computing box 520 in various embodiments, one or more of these wirelessly coupled devices 500, 520, and 580 may work in tandem with one another to customize IO commands for a sensed solid object 591, 592, or 593 placed upon the customizable universal digital docking input pad 580 and acting as an IO device for the information handling system 500. The user in an embodiment may also apply touch or force to the interface surface of the customizable universal digital docking input pad 580 as detected by the capacitive, resistive or other array of force or touch sensors using a hand, finger, or solid object such as mouse 591, keyboard keys 592, button 593, pencil or stylus 596 or others to provide input for the information handling system 500. The interface surface of the customizable universal digital docking input pad 580 having a capacitive sensor array, resistive sensor array, or other touch and pressure sensor array under the interface surface in an embodiment may sense pressure of a solid object 591, 592, 593, or 596 and transmit a location or shape of the solid object on the customizable universal digital docking input pad 580 to the information handling system 500. In other embodiments, a shape, size, or arrangement of the solid object or its components 591, 592, 593, or 596 as detected by the capacitive sensor array, resistive sensor array, or other touch and pressure sensor array under the interface surface may be transmitted to the information handling system 500 as well.

The information handling system 500 (e.g., laptop computer) may prompt the user, via a graphical user interface (GUI), to identify an IO device type for the sensed solid object 591, 592, 593, or 596, if not a default identified IO device. For example, the IO device type may be a keyboard 592, a mouse 591, button 593, or a stylus 596. The information handling system 500 may identify an area on a graphic map of the customizable universal digital docking input pad 580 not currently occupied by a solid object in some embodiments in which other solid objects may be placed upon the customizable universal digital docking input pad 580 as an IO device for the information handling system 500. A hardware processor at the information handling system 500 in an embodiment may execute machine readable code instructions of universal input pad customization system to display to the user, via a graphic map of the customizable universal digital docking input pad 580 on a GUI, open or free space on the customizable universal digital docking input pad 580 that the user may dedicate toward a drawing/touch canvas area 597.

Upon placement of such a solid object 591, 592, 593, or 596 within such identified free space or canvas area 597, the hardware processor at the information handling system 500 may execute machine readable code instructions of the universal input pad customization system to prompt the user, via the GUI, to identify an IO device type for the sensed solid object, if not a default identified IO device such as a portion of a user's hand or finger. Upon the user selecting or confirming the IO device type for the detected solid object 591, 592, 593 or 596, the information handling system 500 may transmit the user-selected IO device type or default IO device type to the customizable universal digital docking input pad 580 for identifying the type of IO commands that should be generated pursuant to detected force or movement of the solid object 591, 592, 593, or 596 for example. Once established the shape, size or arrangement of the solid object 591, 592, 593, or 596 is established with the customizable universal digital docking input pad 580 for IO commands to the information handling system 500 when sensed and while the information handling system is operating in connection with the customizable universal digital docking input pad 580 for IO devices.

The user may then apply touch or force to a drawing/touch canvas area 597 of the customizable universal digital docking input pad 580 using a hand, finger, pencil or stylus 596, or place a solid object such as a mouse 591, keyboard 592, or button 593 upon an interface surface of the customizable universal digital docking input pad 580 to provide input for the information handling system 500. A microprocessor at the customizable universal digital docking input pad 580 may execute machine readable code instructions of a universal input pad customization agent or a machine learning model to associate a sensed force or movement of the solid object 591, 592, 593, or 596 with an IO command for the identified IO device tailored to the user-specified or default IO device type identified for the information handling system 500. Further, these IO commands and detected movement, force or other use application involving input movements of the solid object 591, 592, 593, or 596 is tuned and potentially customized to the usage characteristics of the current user pursuant to a universal docking input pad customization trained ML model detecting and adapting usage by an individual user of a solid object 591, 592, 593, or 596 as a designated or default IO device. The customizable universal digital docking input pad 580 in an embodiment may then transmit the determined IO command, as tuned if such customized tuning applies, to the information handling system 500 for processing via the hardware processor of the information handling system 500.

Figure 6A:
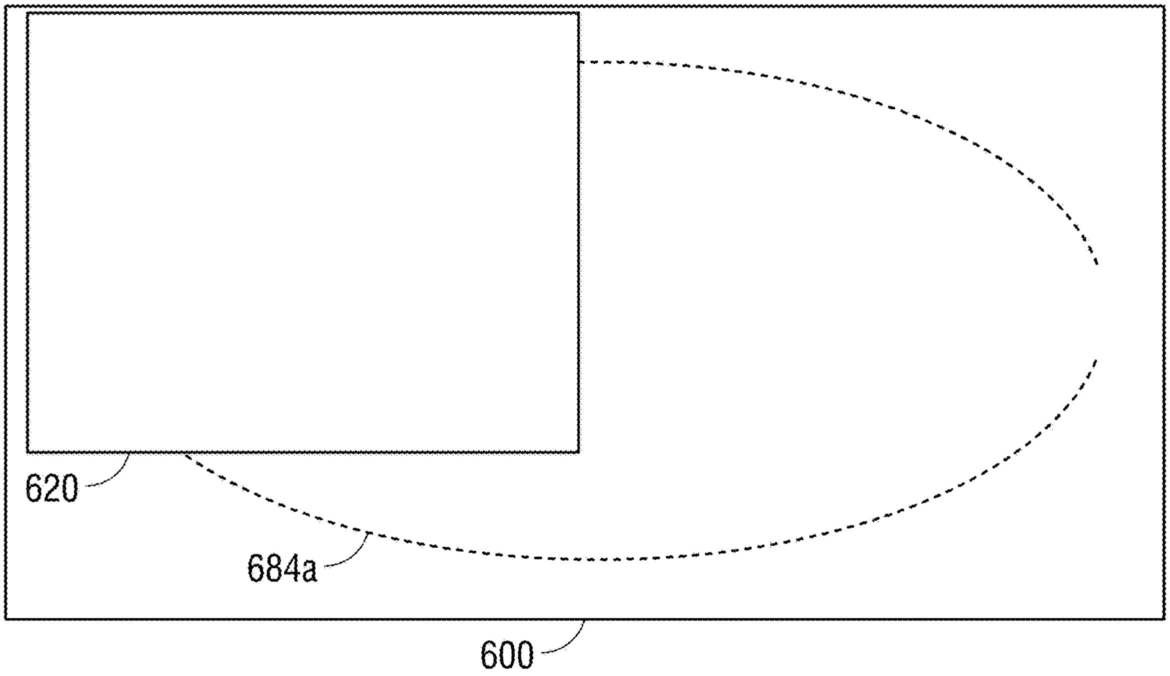
FIG. 6A is a graphical diagram illustrating a top view of a customizable universal digital docking input pad drawing power from an NPU AI edge computing box, via a first configuration of inductive coils according to an embodiment of the present disclosure.

FIG. 6A is a graphical diagram illustrating a top view of a customizable universal digital docking input pad drawing power from a neural processing unit (NPU) artificial intelligence (AI) edge computing box placed atop the customizable universal digital docking input pad, via a first configuration of inductive coils according to an embodiment of the present disclosure. In an embodiment in which the user has placed the NPU AI edge computing box 620 directly on top of an interface surface of the customizable universal digital docking input pad 680, the NPU AI edge computing box 620 may wirelessly charge the customizable universal digital docking input pad 680 via one or more inductive coils, such as 684*a*, within the customizable universal digital docking input pad 680 and under the interface surface. These inductive coils, such as 684*a*, may be formed in various types of configurations within the customizable universal digital docking input pad 680, including placement of a single inductive coil 684*a* in a loop between the edges of the customizable universal digital docking input pad 680.

Figure 6B:
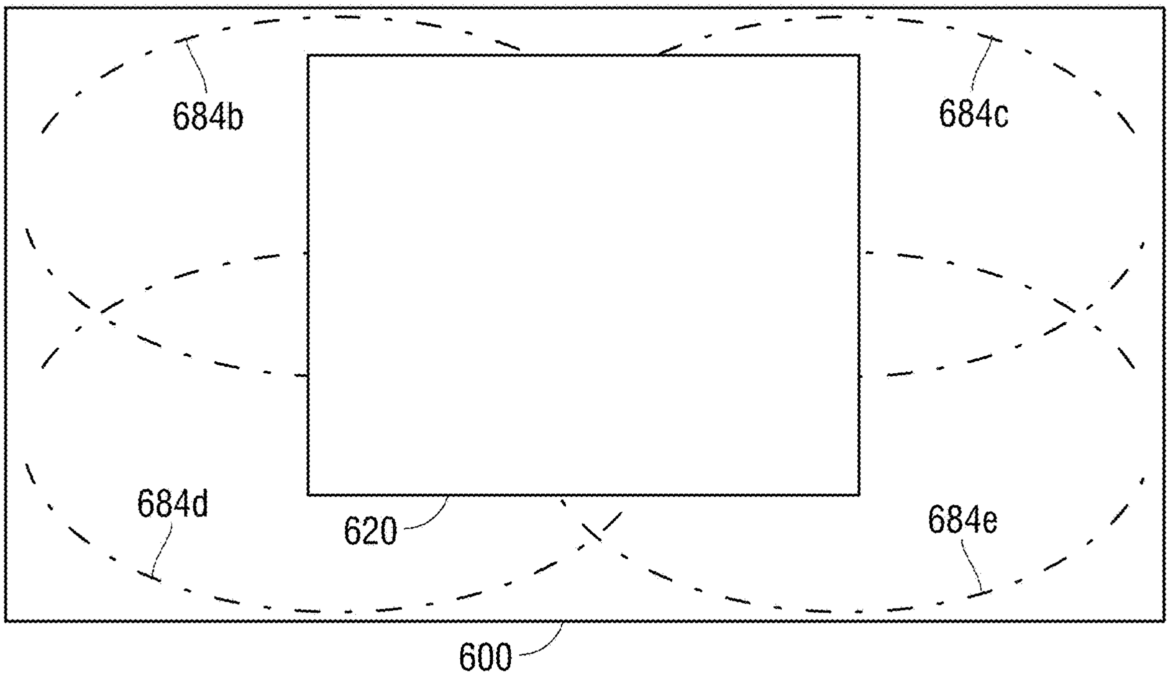
FIG. 6B is a graphical diagram illustrating a top view of a customizable universal digital docking input pad drawing power from an NPU AI edge computing box, via a second configuration of inductive coils according to an embodiment of the present disclosure.

FIG. 6B is a graphical diagram illustrating a top view of a customizable universal digital docking input pad drawing power from a neural processing unit (NPU) artificial intelligence (AI) edge computing box placed atop the customizable universal digital docking input, via a second configuration of inductive coils according to an embodiment of the present disclosure. The inductive coils drawing power from the NPU AI edge computing box 620 placed upon the interface surface customizable universal digital docking input pad 680, may also be formed as a plurality of overlapping loops 684*b*, 684*c*, 684*d*, and 684*e* within the edges of the customizable universal digital docking input pad 680 and under the interface surface of the customizable universal digital docking input pad 680.

Figure 6C:
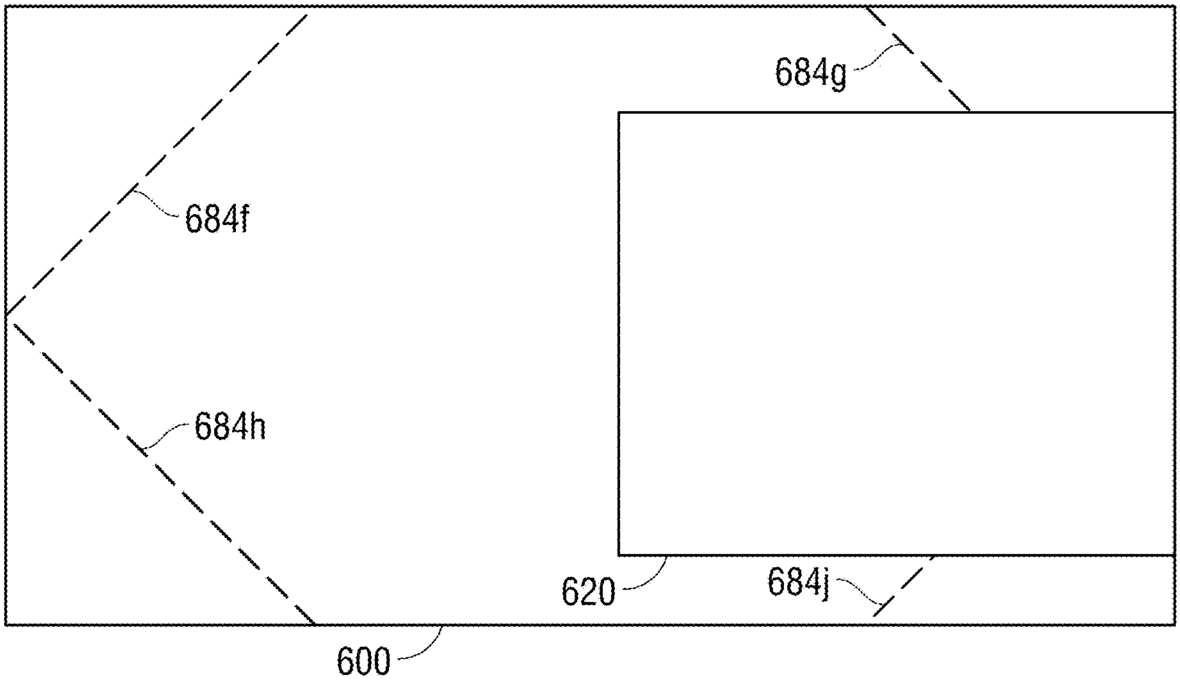
FIG. 6C is a graphical diagram illustrating a top view of a customizable universal digital docking input pad drawing power from an NPU AI edge computing box, via a third configuration of inductive coils according to an embodiment of the present disclosure.

FIG. 6C is a graphical diagram illustrating a top view of a customizable universal digital docking input pad drawing power from a neural processing unit (NPU) artificial intelligence (AI) edge computing box placed atop the customizable universal digital docking input, via a third configuration of inductive coils according to an embodiment of the present disclosure. The inductive coils drawing power from the NPU AI edge computing box 620 placed upon the customizable universal digital docking input pad 680, may also be formed as a plurality of straight line inductive coil elements **684*f*, 684*g*, 684*h*, and 684*j* crossing the corners of the customizable universal digital docking input pad 680 and located under the interface surface of the customizable universal digital docking input pad 680**.

Figure 7:
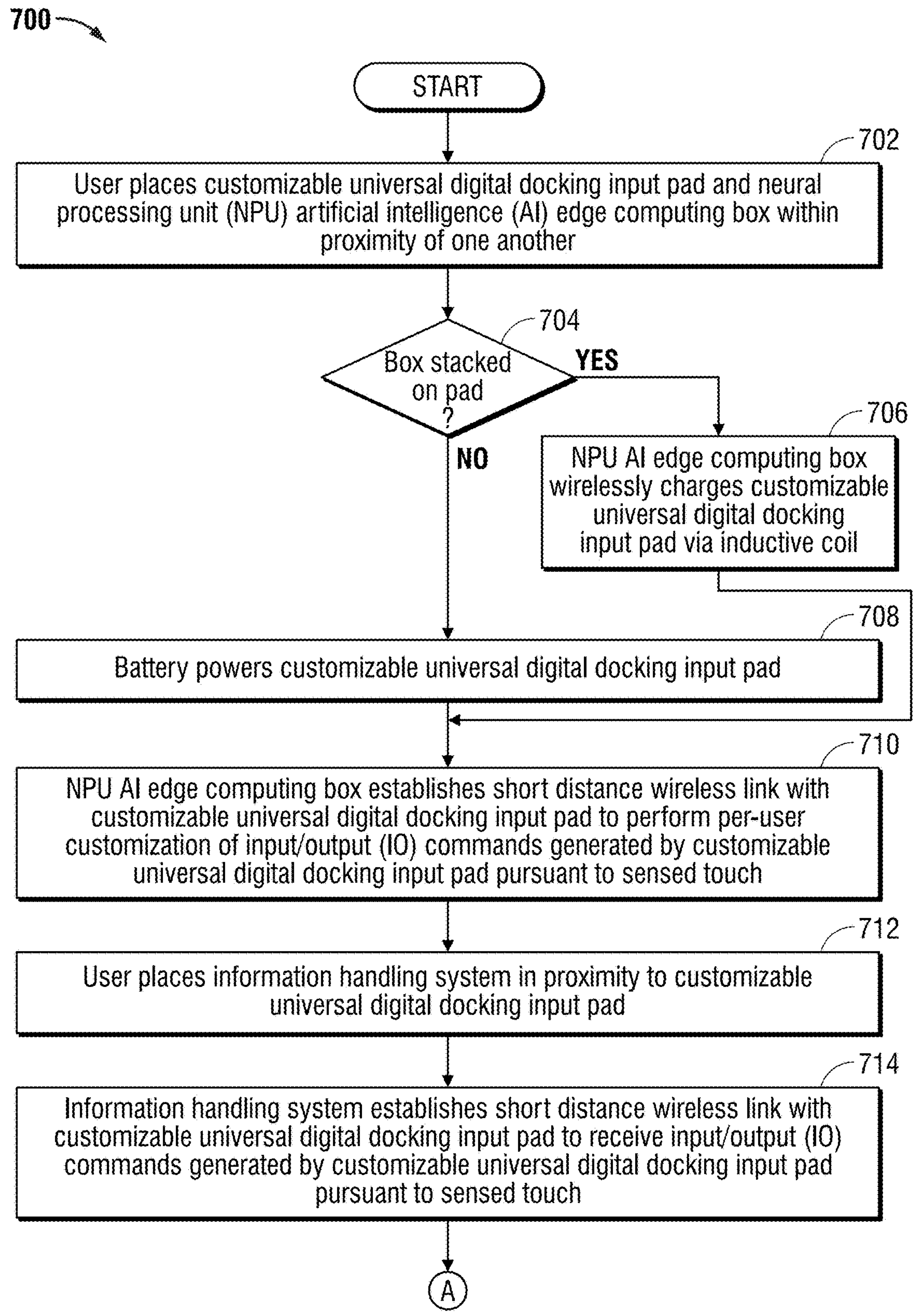
FIG. 7 is a flow diagram illustrating a method of customizing input/output (IO) commands for a solid object acting as an IO device undergoing sensed movement or downward pressure on a customizable universal digital docking input pad based on usage characteristics according to an embodiment of the present disclosure.
Figure 7:
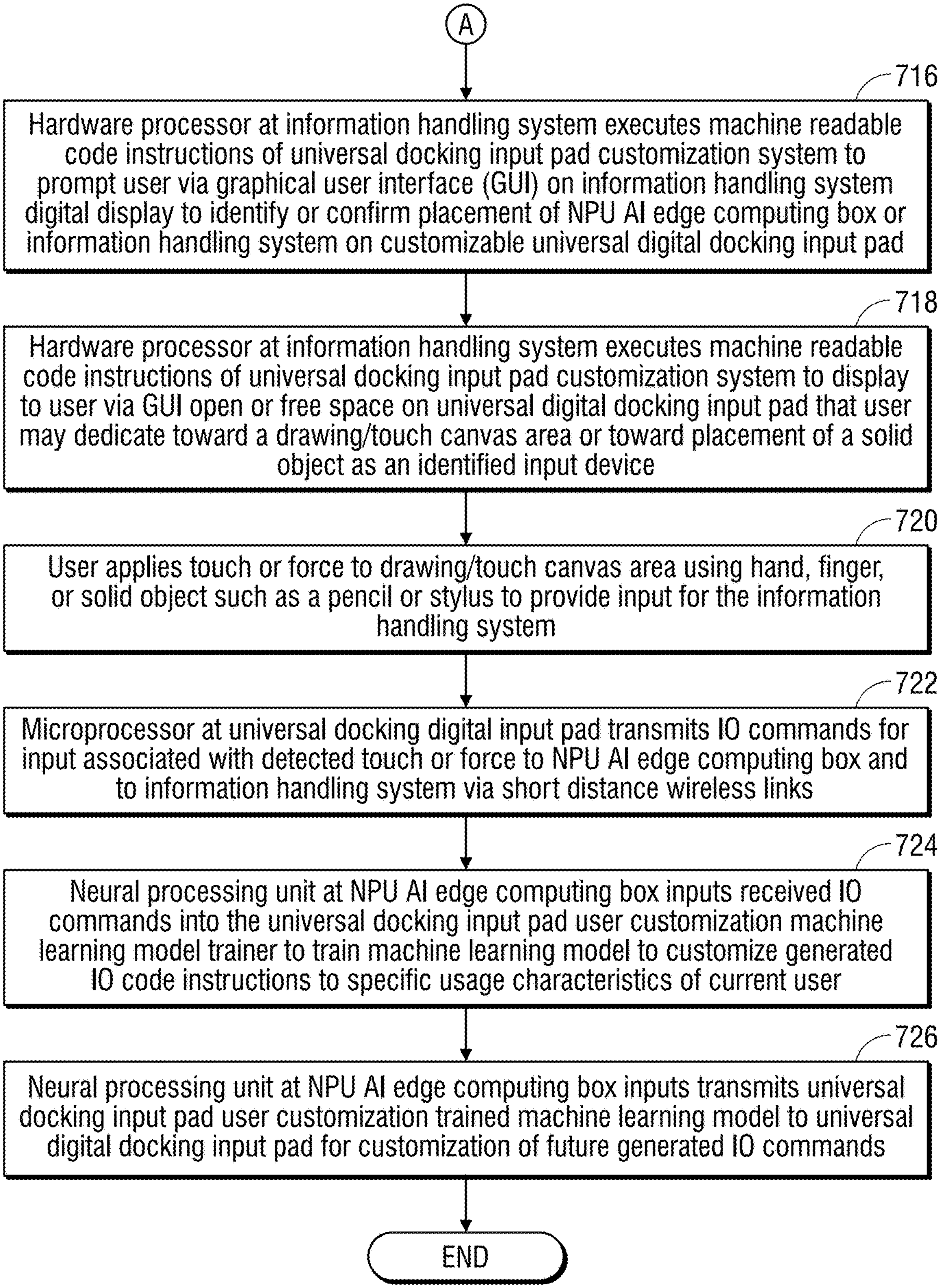

FIG. 7 is a flow diagram illustrating a method of customizing input/output (IO) commands at a neural processing unit (NPU) artificial intelligence (AI) edge computing box for a solid object acting as an IO device undergoing sensed movement or downward pressure on a customizable universal digital docking input pad based on usage characteristics for a current user according to an embodiment of the present disclosure. As described herein, a customizable universal digital docking input pad in combination with an NPU AI edge computing box and information handling system may automatically and wirelessly pair with one another when proximity or contact between these devices is sensed, automatically determine presence of a solid object acting as an IO device placed upon the customizable universal digital docking input pad interface surface, determine a user-specified IO device type or default IO device type for the sensed solid object, and generate and transmit to an information handling system user-customized input/output (IO) commands of the user-specified device type or default IO device type based on the detected movement of the solid object with respect to the customizable universal digital docking input pad interface surface.

At block 702, the user may place a customizable universal digital docking input pad and neural processing unit (NPU) artificial intelligence (AI) edge computing box within proximity of or in contact with one another in an embodiment. The customizable universal digital docking input pad in an embodiment may comprise a grid of capacitive touch pad, or a grid of resistive touch sensors, for example. The NPU AI edge computing box may sense that the information handling system or customizable universal digital docking input pad is stacked above or beneath it via a plurality of pressure sensors in one embodiment. For example, in an embodiment described with respect to FIG. 2, the NPU AI edge computing box 220 may sense that the information handling system 200 or customizable universal digital docking input pad 280 is stacked above or beneath it via one or more pressure sensors 253 sensing downward force from the weight of the information handling system 200 upon the NPU AI edge computing box 220 or the weight of the NPU AI edge computing box 220 on the customizable universal digital docking input pad 280. In another example embodiment, a capacitive sensor 251 may sense the presence of the information handling system 200 or the customizable universal digital docking input pad 280 nearby the NPU AI edge computing box 220. In still another example embodiment, a wireless relative signal strength indicator (RSSI) sensor 252 may determine that the information handling system 200 or the customizable universal digital docking input pad 280 is located within a short distance of the NPU AI edge computing box 220 based on the strength of a wireless communication signal emitted from those devices 200 and 280.

In yet other embodiments, the customizable universal digital docking input pad 280 may sense the presence of the information handling system 200 or NPU AI edge computing box 220 placed on the customizable universal digital docking input pad 280 by the capacitive touch sensor 281, resistive touch sensor 282, or other pressure or touch sensor under an interface surface at the customizable universal digital docking input pad 280 to trigger polling to or responding to polling from the information handling system 200 or NPU AI edge computing box 220 via short-range radio 288. In other cases, the customizable universal digital docking input pad 280 may sense the presence of the information handling system 200 or NPU AI edge computing box 220 placed nearby but not upon the customizable universal digital docking input pad 280 by wireless adapter or radio 288 polling to or responding to polling from the information handling system 200 or NPU AI edge computing box 220 via short-range radio 288. In further embodiments, the proximity nearby of 200 and 220 may be detected by the capacitive sensor array 281 operating as a capacitive proximity sensor or another proximity sensor on the customizable universal digital docking input pad 280.

For example, the customizable universal digital docking input pad may sense that the information handling system or NPU AI edge computing box are nearby, though not currently placed on the customizable universal digital docking input pad. In an example embodiment described with respect to FIG. 5, the customizable universal digital docking input pad 580 may sense the presence of the information handling system 500 or NPU AI edge computing box 520 placed nearby but not upon the customizable universal digital docking input pad 580 by polling to or responding to polling from the information handling system 500 or NPU AI edge computing box 520 via short-range wireless link, such as a wireless link adhering to an inter-integrated circuit (I2C), inter-integrated circuit sound (I2S), near-field communication (NFC), Bluetooth® (BT), or BT low energy (BTLE) communication protocol. In another example, a plurality of capacitive sensors disposed across the interface surface of the customizable universal digital docking input pad 580 in an embodiment may simultaneously collect data to form a combined, high sensitivity capacitive proximity sensor to detect the nearby information handling system **500*a* or NPU AI edge computing box 520 by comparing capacitive measurements among these sensors and determine a shape or size of the nearby information handling system 500*a* or NPU AI edge computing box 520**.

It may be determined in an embodiment at block 704 whether the user has stacked the NPU AI edge computing box in contact on top of the customizable universal digital docking input pad. If the user has placed the NPU AI edge computing box directly on top of the customizable universal digital docking input pad, the method may proceed to block 706 for inductive charging of the customizable universal digital docking input pad. If the user has not placed the NPU AI edge computing box directly on top of the customizable universal digital docking input pad, the method may proceed to block 708 for powering the customizable universal digital docking input pad via a battery.

At block 706, in an embodiment in which the user has placed the NPU AI edge computing box directly on top of the customizable universal digital docking input pad, the NPU AI edge computing box may wirelessly charge the customizable universal digital docking input pad via one or more inductive coils in the customizable universal digital docking input pad. For example, in an embodiment described with respect to FIG. 2, power from the battery 261 or AC power adapter 262 may be wireless transferred to the customizable universal digital docking input pad 280 via inductive coil 284 when the NPU AI edge computing box 220 is placed atop and in direct contact with the customizable universal digital docking input pad 280 in a stacked configuration. It is contemplated in some embodiments that the information handling system 200 placed in contact on the customizable universal digital docking input pad 280 may also wireless charge the customizable universal digital docking input pad 280 via an inductive power coil 284 under the interface surface if the information handling system 200 has an inductive charging capability built into its bottom chassis.

In an embodiment at block 708 in which the user has not placed the NPU AI edge computing box directly on top of the customizable universal digital docking input pad, a battery may power the customizable universal digital docking input pad. For example, the battery 287 may control power to one or more components including the hardware microprocessor 285, radio 288, antenna 289, and other components that may require power when sensing solid objects placed on the customizable universal digital docking input pad 280, such as sensors 281 or 282.

At block 710, the NPU AI edge computing box in an embodiment may establish a short distance wireless link with the customizable universal digital docking input pad to perform per-user customization of input/output (IO) commands generated by the customizable universal input pad pursuant to sensed touch. The short range radio 288 of the customizable universal digital docking input pad 280 in an embodiment may establish a wireless link 277 to the NPU AI edge computing box 220, and a wireless link 278 to the information handling system 200 via antenna 289. In an embodiment, the customizable universal digital docking input pad 280 may be used to communicate with the information handling system 200 or the NPU AI edge computing box 220, via, for example, a Bluetooth® or Bluetooth® Low Energy (BLE) protocols, or other WPAN or WLAN protocols, such as inter-integrated circuit (I2C), inter-integrated circuit sound (I2S) or near field communications (NFC) communications protocols.

Proceeding to block 712, the user places an information handling system in proximity or in contact with the customizable universal digital docking input pad. In one example embodiment, the information handling system may be stacked on the NPU AI edge computing box. In another example embodiment, the information handling system may be stacked on the interface surface of the customizable universal digital docking input pad. In yet another embodiment, the information handling system may be placed nearby the NPU AI edge computing box, the customizable universal digital docking input pad, or both such that it is detected within a proximity range by a proximity detector, such as a capacitive or other proximity detector, or by wireless proximity via RSSI detection of beacons to wirelessly connect in various example embodiments.

At block 714, the information handling system in an embodiment may establish a short distance wireless link with the customizable universal digital docking input pad, the NPU AI edge computing box, or both to perform interface with customized input/output (IO) commands generated by the customizable universal input pad pursuant to sensed touch of a solid object as an IO device. The short range radio of the customizable universal digital docking input pad or the NPU AI edge computing box or both in various embodiments may establish a wireless link to the information handling system with their respective antennas. In an embodiment, the customizable universal digital docking input pad may be used to communicate with the information handling system or the NPU AI edge computing box, via, for example, a Bluetooth® or Bluetooth® Low Energy (BLE) protocols, or other WPAN or WLAN protocols, such as inter-integrated circuit (I2C), inter-integrated circuit sound (I2S) or near field communications (NFC) communications protocols as described in embodiments herein.

A hardware processor at the information handling system in an embodiment at block 716 may execute machine readable code instructions of a universal input pad customization system to prompt the user, via a graphical user interface (GUI) on the information handling system digital display, to identify or confirm placement of the NPU AI edge computing box or the information handling system on the customizable universal digital docking input pad. For example, in an embodiment described with respect to FIG. 3, the information handling system 300*a* in an embodiment may prompt the user, via a GUI, to identify or confirm placement of the NPU AI edge computing box 320 or the information handling systems 300*a* or 300*b* on the customizable universal digital docking input pad 380. This may allow the information handling system to further identify an area in which other solid objects may be placed upon the customizable universal digital docking input pad 380 as an IO device for the information handling system 300*a*.

At block 718, the hardware processor at the information handling system in an embodiment may execute machine readable code instructions of universal input pad customization system to display to user, via a mapping of the customizable universal digital docking input pad on a GUI, open or free space on customizable universal digital docking input pad that user may be dedicated toward a drawing/touch canvas area or toward placement of a solid object as an area for an identified IO device. A hardware processor at the information handling system 300*a* in an embodiment may execute machine readable code instructions of universal input pad customization system to display to the user, via the GUI, open or free space on the customizable universal digital docking input pad 380 that the user may dedicate toward a drawing/touch canvas area or toward placement of a solid object 391, 392, or 393 as an identified IO device. In another example embodiment described with respect to FIG. 5, the information handling system 500 may identify an area not currently occupied by a solid object in which other solid objects may be placed upon the customizable universal digital docking input pad 580 as an IO device for the information handling system 500. A hardware processor at the information handling system 500 in an embodiment may execute machine readable code instructions of universal input pad customization system to display to the user, via the GUI, open or free space on the customizable universal digital docking input pad 580 that the user may dedicate toward a drawing/touch canvas area 597.

The user may apply touch or force to a drawing/touch canvas area of the customizable universal digital docking input pad at block 720 using hand, finger, or solid object such as a pencil or stylus to provide input for the information handling system. For example, the user may move a solid object acting as a mouse or stylus across the customizable universal digital docking input pad. As another example, the user may press down upon such a solid object acting as a mouse or stylus, or upon another solid object acting as a stationary key or button. The customizable universal digital docking input pad of embodiments herein may be designed from flexible low or high compressible material that give users the sense or pressure when applying force. Further, the customizable universal digital docking input pad may be made of material that is rollable or foldable such that it may be stored away or easily transported in embodiments herein.

At block 722, a microprocessor at the customizable universal digital docking input pad in an embodiment may transmit IO commands associated with a detected touch or force to the NPU AI edge computing box and to the information handling system via short distance wireless links. For example, the customizable universal digital docking input pad may transmit data indicating movement of the solid object acting as a mouse or stylus for execution of IO commands cursor movement or drawing at the information handling system. In another example, the customizable universal digital docking input pad may transmit indicating a downward force or change in intensity in such a downward force upon such a solid object acting as a mouse or stylus or upon another solid object acting as a key or button as IO commands to the information handling system. Details such as speed, duration, level of pressure, angle of pressure, and other factors of the solid device movement on the capacitive, resistive, or other touch or force sensor array of the customizable universal digital docking input pad that may be detected for a designated IO device as intended IO commands may also be transmitted to the NPU AI edge computing box and input into a universal input pad user customization machine learning model trainer and associated with a particular user in embodiments herein.

A neural processing unit at the NPU AI edge computing box in an embodiment at block 724 may input received IO commands and usage details of those inputs with the solid object into a universal input pad user customization machine learning model trainer to train a machine learning model to customize generated IO commands to specific usage characteristics of the current user. For example, in an embodiment described with respect to FIG. 2, an NPU 221 at the NPU AI edge computing box 220 in an embodiment may input received IO commands into a universal input pad user customization machine learning model trainer 222 to train a machine learning model **286*b* to customize generated IO commands to specific usage characteristics of the current user. For example, IO commands for a solid object acting as a mouse may be customized using a machine learning model 286*b* to adjust the IO commands generated due to detected movement speeds or pressure on the solid object acting as a mouse based on user hand speed, magnitude of force used, or rapidity of downward motions registering as mouse clicks. As another example, IO commands for a solid object acting as a stylus (e.g., a pencil or the user's finger) or keyboard key may be customized using the machine learning model 286*b*** to adjust the IO commands generated due to detected movement and level of pressure, angles of pressure, speeds and durations of movements of the solid object for IO commands such as cursor controls or activating functions, such as automatically placing generated text in bold, when a sufficient level of pressure is detected. These user specific usage details may train the universal input pad user customization trained machine learning model for the use of a solid objection on the customizable universal digital docking input pad as a particular identified or default IO device to tune the responsive IO commands such as for sensitivity to force or speed and length of movements among other factors customized for the detected details of the user's usage of such an IO device.

At block 726, the neural processing unit at the NPU AI edge computing box in an embodiment may transmit the universal input pad user customization trained machine learning model to the customizable universal digital docking input pad for customization of future generated IO commands. The wireless interface adapter 270 at the NPU AI edge computing box 220 may transmit the universal input pad user customization trained machine learning model **286*b* to the customizable universal digital docking input pad 280 via wireless link 277** for customization of future generated IO commands.

In such a way, a customizable universal digital docking input pad may operate in combination with an NPU AI edge computing box or alone with the information handling system to automatically and wirelessly pair with one another when proximity or contact between these devices is sensed, automatically determine presence of a solid object acting as an IO device placed upon the customizable universal digital docking input pad, and determine a user-specified IO device type or default IO device type for the sensed solid object and implement IO commands for that device as tuned by the universal input pad user customization trained machine learning model for the user. The method for customizing IO commands for a solid object acting as an IO device undergoing sensed movement or downward pressure on a customizable universal digital docking input pad may then end.

Figure 8:
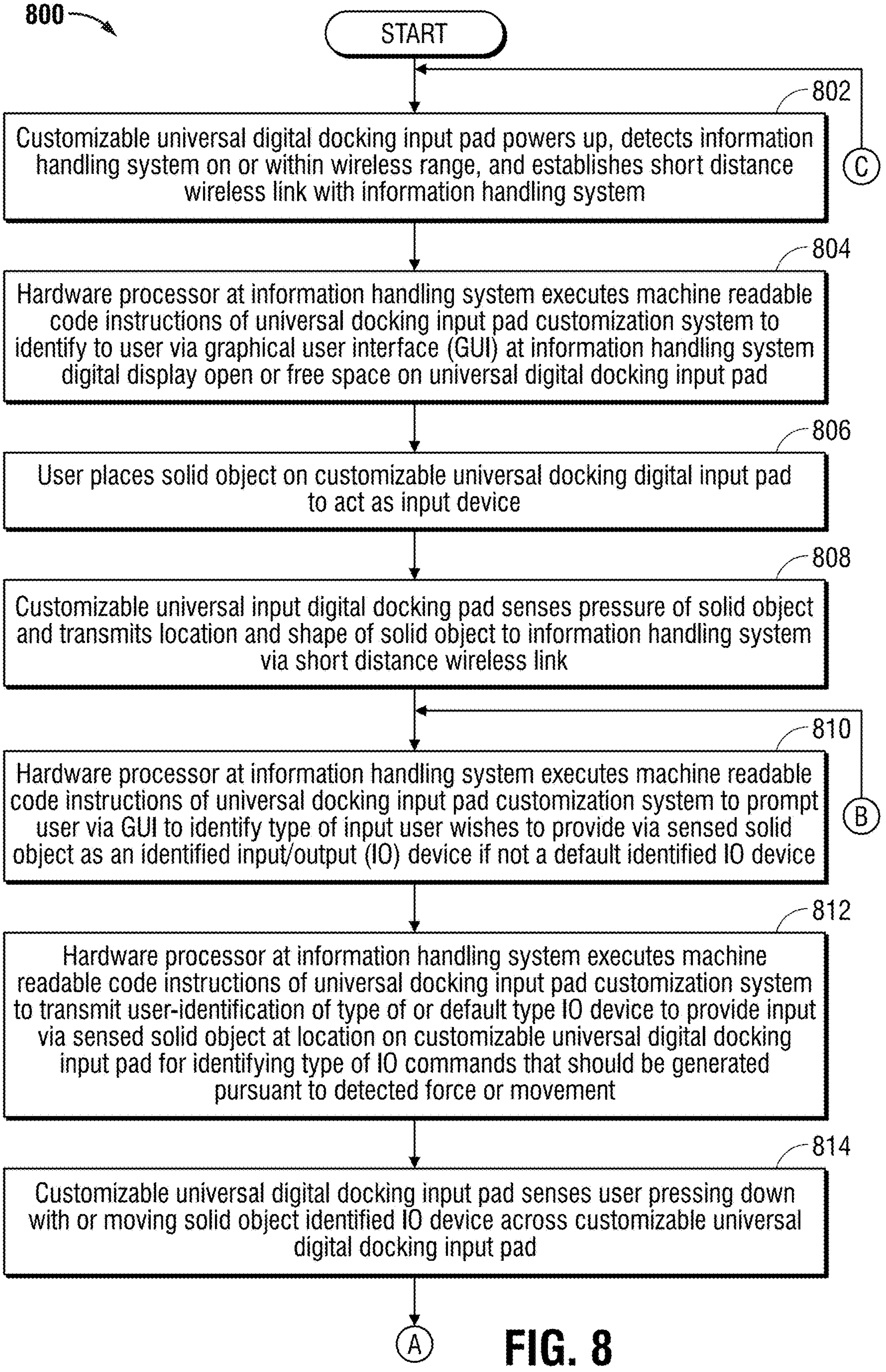
FIG. 8 is a flow diagram illustrating a method of generating and transmitting IO commands for a solid object acting as an IO device of a user-specified IO device type undergoing sensed movement or downward pressure on a customizable universal digital docking input pad to a wirelessly coupled information handling system according to an embodiment of the present disclosure.
Figure 8:
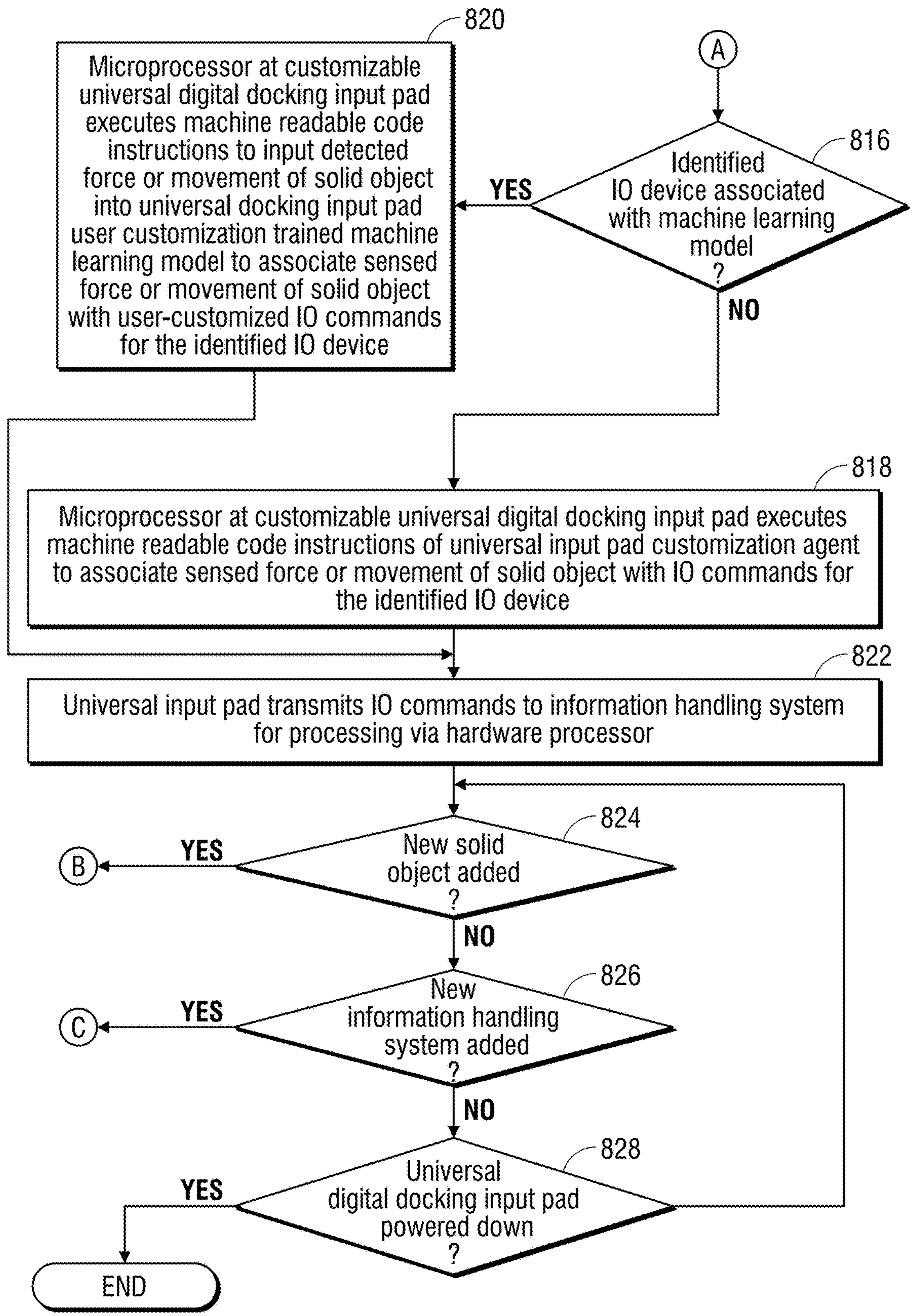

FIG. 8 is a flow diagram illustrating a method of generating and transmitting input/output (IO) commands for a solid object acting as an IO device undergoing sensed movement or downward pressure on a customizable universal digital docking input pad to a wirelessly coupled information handling system according to an embodiment of the present disclosure. As described herein, a customizable universal digital docking input pad in combination with an NPU AI edge computing box and information handling system may automatically and wirelessly pair with one another when proximity between these devices is sensed, automatically determine presence of a solid object acting as an IO device placed upon the customizable universal digital docking input pad, and determine a user-specified IO device type for the sensed solid object. Following such assignment of an IO device type for such a sensed solid object placed on the customizable universal digital docking input pad in various embodiments herein, the customizable universal digital docking input pad may generate IO commands associated with movement or downward pressure on those solid objects, as sensed at the customizable universal digital docking input pad, for IO commands for interaction with software applications executing on the information handling system.

At block 802, a customizable universal digital docking input pad in an embodiment may power up, detect an information handling system on or within proximity or wireless range of the customizable universal digital docking input pad and establish a wireless link with the information handling system. A capacitive sensor array, resistive sensor array, or other pressure or touch sensor array of the customizable universal digital docking input pad may detect stacking of the information handling system on the interface surface of the customizable universal digital docking input pad to trigger polling or accepting polling to establish a short range wireless link in an embodiment. In another embodiment, the capacitive sensor array may operate as a proximity sensor or another proximity sensor such as IR or RSSI level detector may be used by the customizable universal digital docking input pad to detect proximity within a wireless range of the information handling system to the customizable universal digital docking input pad to trigger polling or accepting polling to establish a short range wireless link in an embodiment. In yet other embodiments, the polling or accepted polling for a wireless link may determine proximity of the information handling system to the customizable universal digital docking input pad may in an embodiment. In an embodiment described with respect to FIG. 2, the short range radio 288 of the customizable universal digital docking input pad 280 in an embodiment may establish a wireless link 277 to the NPU AI edge computing box 220, and a wireless link 278 to the information handling system 200 via antenna 289. In an embodiment, the customizable universal digital docking input pad 280 may be used to communicate with the information handling system 200 or the NPU AI edge computing box 220, via, for example, a Bluetooth® or Bluetooth® Low Energy (BLE) protocols, or other WPAN or WLAN protocols, such as inter-integrated circuit (I2C), inter-integrated circuit sound (I2S) or near field communications (NFC) communications protocols.

A hardware processor at the information handling system in an embodiment at block 804 may execute machine readable code instructions of a universal input pad customization system to identify to a user, via a graphical user interface (GUI) at the information handling system digital display, open or free space on the customizable universal digital docking input pad. For example, in an embodiment described with respect to FIG. 5, the information handling system 500 may identify an area not currently occupied by a solid object on a mapping of the customizable universal digital docking input pad 580 by presentation on a GUI where that area may provide for other solid objects to be placed upon the customizable universal digital docking input pad 580 as an IO device for the information handling system 500. A hardware processor at the information handling system 500 in an embodiment may execute machine readable code instructions of universal input pad customization system to display to the user, via the GUI, open or free space on the customizable universal digital docking input pad 580 that the user may dedicate toward a drawing/touch canvas area 597 in another embodiment.

At block 806, the user may place a solid object on the customizable universal digital docking input pad to act as an IO device to the information handling system in an embodiment. For example, in an embodiment described with respect to FIG. 4, the customizable universal digital docking input pad 480 may sense placement, movement, or downward pressure on a solid object, such as one or more individual keyboard keys 492*a*, 492*b*, 492*c*, 493*d*, 494*e*, 494*f*, 494*g*, or 494*h*, mouse 491, or button 493 that the user wishes to use as an IO device upon the customizable universal digital docking input pad 480.

The customizable universal digital docking input pad in an embodiment at block 808 may sense pressure of a solid object and transmit a location or shape of the solid object via a capacitive sensor array, resistive sensor array, another pressure or touch sensor array or some combination and transmit the same to the information handling system, via a short distance wireless link. For example, in an embodiment described with respect to FIG. 3, the customizable universal digital docking input pad 380 in an embodiment may comprise a thin, touch-sensitive pad for sensing, through capacitive touch, resistive force, pressure sensors, or a combination of the same, for the placement, movement, or downward pressure on a solid object, such as keyboard keys 393, mouse 391, or button 393 that the user wishes to use as an IO device upon the customizable universal digital docking input pad 380. More specifically, the customizable universal digital docking input pad 380 in an embodiment may be a capacitive touch array under an interface surface with a plurality of capacitive touch sensors. As another example, the customizable universal digital docking input pad 380 may comprise a grid of resistive touch sensors or pressure sensors located at the grid crossings shown in FIG. 3 and under or on an interface surface to sense downward pressure on the customizable universal digital docking input pad 380.

At block 810 in an embodiment, the hardware processor at the information handling system may execute machine readable code instructions of the universal input pad customization system to prompt the user, via the GUI, to identify an IO device type for the sensed solid object, if not a default identified IO device. For example, the information handling system 300*a* (e.g., laptop computer) may prompt the user, via a graphical user interface (GUI), to identify an IO device type for the sensed solid object 391, 392, 393, 300*a*, 320, or 300*b*, if it is not a default identified IO device. The solid object itself may include other information handling systems, such as a smart phone, or solid objects lacking computing abilities, such as a user's hand or fingers, or even a block of wood, if the user wishes to use such an object for providing input to the information handling system 300*a*. Upon placement of such a solid object 391, 392, or 393 within such identified free space or canvas area, the hardware processor at the information handling system 300*a* may execute machine readable code instructions of the universal input pad customization system to prompt the user, via the GUI, to identify an IO device type for the sensed solid object, if not a default identified IO device, such as a portion of a user's hand. In some embodiments, the hardware processor at the information handling system 300*a* may execute machine readable code instructions of the universal input pad customization system to suggest an IO device type for the solid object, such as 391, 392, or 393 based upon a received form factor of the IO device indicating it has a particular shape common to a specific IO device such as a mouse 391, stylus, or keyboard 392.

Once established, continuous detection of this solid object or repeated detection of the shape or form of the solid object on the customizable universal digital docking input pad will refer to the user identified IO device designated for that shape or location on the customizable universal digital docking input pad. In some embodiments, default IO objects may be designated that are repeatedly contacted and removed from the customizable universal digital docking input pad interface surface, such as portions of a user's hands or fingers, or a stylus. Further, in the case of a stylus or the user's hand or fingers a capacitive signature may be detected for those solid objects in some embodiments. Other solid objects such as keys, buttons, mouse or others may remain on the customizable universal digital docking input pad interface surface and be repeatedly used. Nonetheless, if removed and returned, shape, size, arrangement, and a capacitive signature may be linked to a designated IO device for that information handling system in embodiments herein.

In an embodiment at block 812, the hardware processor at the information handling system may execute machine readable code instructions of the universal input pad customization system to transmit a user-selected IO device type or default IO device type to the customizable universal digital docking input pad for identifying the type of IO commands that should be generated pursuant to detected force or movement of the solid object for the selected or default IO device type. Upon the user selecting or confirming the IO device type for the detected solid object 391, 392, or 393, the information handling system 300*a* may transmit the user-selected IO device type or default IO device type to the customizable universal digital docking input pad 380 for identifying the type of IO commands that should be generated pursuant to detected force or movement of the solid object 391, 392, or 393, for example.

At block 814, the customizable universal digital docking input pad in an embodiment may sense the user pressing down with or moving the solid object across the customizable universal digital docking input pad. For example, the user may move a solid object acting as a mouse or stylus across the customizable universal digital docking input pad. As another example, the user may press down upon such a solid object acting as a mouse or stylus, or upon another solid object acting as a stationary key or button or to highlight an item. The customizable universal digital docking input pad may record data indicating movement, downward force or change in intensity in such a downward force of the solid object acting as a mouse or stylus or upon another solid object acting as a key or button.

It may be determined at block 816 in an embodiment whether the user-selected IO device type, as well as an identified user, is associated with a trained machine learning model at the customizable universal digital docking input pad. Such a trained machine learning model may be stored in memory at the customizable universal digital docking input pad in an embodiment and may have been trained according to embodiments such as described in FIG. 7. If the user-selected IO device type is not associated with a machine learning model at the customizable universal digital docking input pad, the method may proceed to block 818 for determining IO commands for the solid object depending on the user-selected IO device type or default IO device type alone. If the user-selected IO device type is associated with a machine learning model at the customizable universal digital docking input pad, the method may proceed to block 820 for determining IO commands and tuning of those IO commands for the solid object based on outputs of the trained machine learning model for that particular identified user. The information handling system may provide, via the user, identification of the user for association with the trained machine learning model tuning of IO device usage with the solid objection on the customizable universal digital docking input pad. In some embodiments, a default user may be applied such as for a personal workspace location of the customizable universal digital docking input pad.

At block 818, in an embodiment in which the user-selected IO device type is not associated with a machine learning model at the customizable universal digital docking input pad, a microprocessor at the customizable universal digital docking input pad may execute machine readable code instructions of a universal input pad customization agent to associate a sensed force or movement of the solid object with an IO command for the identified IO device. For example, in an embodiment described with respect to FIG. 3, in which the user-selected IO device type associated with the solid object 391, 392, or 393 undergoing downward force or movement is not associated with a machine learning model at the customizable universal digital docking input pad 380, a microprocessor at the customizable universal digital docking input pad 380 may execute machine readable code instructions of a universal input pad customization agent to associate a sensed force or movement of the solid object 391, 392, or 393 with an IO command for the identified IO device based solely on the IO device type received from the information handling system 300*a* for that solid object 391, 392, or 393. The method may then proceed to block 822 for transmission of the determined IO commands to the information handling system.

In an embodiment at block 820, in which the user-selected IO device type and an identified user is associated with a trained machine learning model at the customizable universal digital docking input pad, the microprocessor at the customizable universal digital docking input pad may execute machine readable code instructions to input the detected force or movement of the solid object into the universal input pad user customization trained machine learning model to associate the sensed force or movement of the solid object with a user-customized IO command for the identified IO device. The user-customized IO command for the identified IO device may relate to tuning of sensitivity in response to movement inputs to the solid object for the identified IO device or may relate to customized commands associated with particular movement or press inputs or ways a solid object is used on the customizable universal digital docking input pad.

For example, in an embodiment described with respect to FIG. 2, in which the user-selected IO device type is associated with a machine learning model 286*b* at the customizable universal digital docking input pad 280, the microprocessor 285 at the customizable universal digital docking input pad 280 may execute machine readable code instructions 286*a* to input the detected force or movement of the solid object into the universal input pad user customization trained machine learning model 286*b* to associate the sensed force or movement of the solid object with a user-customized IO command for the identified IO device. The method may then proceed to block 822 for transmission of the determined IO commands to the information handling system.

At block 822, the customizable universal digital docking input pad in an embodiment may transmit the determined IO command to the information handling system for processing via the hardware processor of the information handling system. For example, in an embodiment described with respect to FIG. 5, a microprocessor at the customizable universal digital docking input pad 580 may execute machine readable code instructions of a universal input pad customization agent or a machine learning model to associate a sensed force or movement of the solid object 591, 592, 593, or 596 with an IO command for the identified IO device tailored to the user-specified or default IO device type received from the information handling system 500 and potentially customized to the usage characteristics of the current user. The customizable universal digital docking input pad 580 in an embodiment may then transmit the determined IO command to the information handling system 500 for processing via the hardware processor of the information handling system 500.

It may be determined at block 824 in an embodiment whether a new solid object has been detected upon the customizable universal digital docking input pad. If a new solid object has not been detected upon the customizable universal digital docking input pad, the method may proceed to block 826 for determination as to whether any new information handling systems have been placed on or nearby the customizable universal digital docking input pad. If a new solid object has been detected upon the customizable universal digital docking input pad at block 824, the method may proceed back to block 810 to prompt the user to identify an IO device type for the second solid object placed on the customizable universal digital docking input pad and the method may proceed as before.

At block 826 in an embodiment, it may be determined whether a new information handling system has been placed on or nearby the customizable universal digital docking input pad. If a new information handling system has not been placed on or nearby the customizable universal digital docking input pad, the method may proceed to block 828 for determination as to whether the customizable universal digital docking input pad has been powered down or entered a sleep mode. If a new information handling system has been placed on or nearby the customizable universal digital docking input pad, the method may proceed back to block 802 to establish a wireless link between the newly identified information handling system and the customizable universal digital docking input pad.

In an embodiment at block 826, it may be determined whether the customizable universal digital docking input pad has been powered down. If the customizable universal digital docking input pad has not been powered down or entered sleep mode, the method may proceed back to block 824 to monitor for any new solid objects being placed upon the customizable universal digital docking input pad or any new information handling systems being placed on or nearby the customizable universal digital docking input pad. In an example embodiment, the customizable universal digital docking input pad has not been powered down or entered sleep mode when no information handling system or NPU AI edge computing box is in contact or wirelessly coupled to the customizable universal digital docking input pad. After a period of time, the customizable universal digital docking input pad may power down or entered a sleep mode when the information handling system is removed or turned off in one example embodiment. If the customizable universal digital docking input pad has been powered down or entered a sleep mode, the method for generating and transmitting input/output (IO) commands for a solid object acting as an IO device undergoing sensed movement or downward pressure on a customizable universal digital docking input pad to a wirelessly coupled information handling system may then end.

The blocks of the flow diagram of FIGS. 7 and 8 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those capable in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A customizable universal digital docking input pad executing a universal docking input pad customization agent comprising:

a proximity sensor to detect presence within range of a short distance radio of the customizable universal digital docking input pad of an information handling system for receiving input/output (IO) code instructions from the customizable universal digital docking input pad to establish a first short distance wireless link with the information handling system;

a grid of touch sensitive or force sensitive pressure sensors to detect a location of a solid object placed by the user on the customizable universal digital docking input pad as an IO device for the information handling system;

the short distance radio to transmit the location of the solid object on the customizable universal digital docking input pad via the first short distance wireless link to the information handling system;

the grid of touch sensitive or force sensitive pressure sensors to detect downward force upon or movement of the solid object with respect to the location on the customizable universal digital docking input pad;

a microprocessor to execute machine readable code instructions of the universal docking input pad customization agent to associate the downward force or the movement of the solid object with first IO commands formatted for an identified IO device type; and the short distance radio to transmit the first IO commands to the information handling system.

2. The customizable universal digital docking input pad of claim 1, wherein the first short distance wireless link adheres to an inter-integrated circuit (I2C) communication protocol.

3. The customizable universal digital docking input pad of claim 1, wherein the first short distance wireless link adheres to near-field communication (NFC) protocol.

4. The customizable universal digital docking input pad of claim 1 further comprising:

the solid object that is the identified IO device type is a default IO device type such as a finger or stylus; and the short distance radio to receive, via the first short distance wireless link from the information handling system, a user-selected identification of the IO device type for the solid object when the IO device type is not the default IO device type.

5. The customizable universal digital docking input pad of claim 1, wherein the proximity sensor is the short distance radio detecting a wireless beacon transmitted by the information handling system according to an inter-integrated circuit (I2C) communication protocol or an inter-integrated circuit sound (I2S) communication protocol.

6. The customizable universal digital docking input pad of claim 1 further comprising:

the grid of touch sensitive or force sensitive pressure sensors to detect presence of a neural processing unit (NPU) artificial intelligence (AI) edge computing box placed by the user on the customizable universal digital docking input pad;

the short distance radio to establish a second short distance wireless link with the neural NPU AI edge computing box; and an inductive power coil to receive power from the NPU AI edge computing box to wirelessly charge a battery.

7. The customizable universal digital docking input pad of claim 1 further comprising:

the short distance radio to transmit the IO code instructions to a wirelessly connected neural processing unit (NPU) artificial intelligence (AI) edge computing box;

the short distance radio to receive from the neural NPU AI edge computing box a universal input pad user customization trained machine learning model trained to tailor future IO commands generated at the customizable universal digital docking input pad to usage by a particular user; and the microprocessor to execute machine readable code instructions of the universal docking input pad user customization trained machine learning model to output second IO commands for the identified IO device type based on input values including a later-sensed downward force or a later-sensed movement of the solid object.

8. A method of customizing a customizable universal digital docking input pad for an information handling system comprising:

establishing a short distance wireless link with the information handling system, via a short distance radio;

detecting, via a grid of touch sensitive or force sensitive pressure sensors, locations of a plurality of solid objects placed by the user on the customizable universal input pad as IO devices for the information handling system;

transmitting a first location of a first of the plurality of solid objects and a second location of a second of the plurality of solid objects on the universal digital docking input, via the short distance wireless link, to the information handling system;

receiving, via the short distance radio, from the information handling system a user-selected identification of a first type of IO device for the first solid object;

detecting a first downward force upon or a first movement of the first solid object with respect to the customizable universal digital docking input pad, via the grid of touch sensitive or force sensitive pressure sensors;

associating the first downward force or the first movement of the first solid object with first IO commands formatted for a first type of IO device associated with the first solid object, via a microprocessor executing machine readable code instructions of the universal input pad customization agent; and transmitting, via the short distance radio, the first IO commands to the information handling system.

9. The method of claim 8 further comprising:

identifying the first type of IO device associated with the first solid object as a default IO device type such as a portion of a user's hand; and receiving, via the first short distance wireless link from the information handling system, a user-selected identification of the first type of IO device for the first solid object when the first type of IO device is not the default IO device type.

10. The method of claim 8, wherein the first solid object includes a digital input/output device as the first type of IO device.

11. The method of claim 8, wherein the first solid object includes a non-computing device as the first type of IO device.

12. The method of claim 8 further comprising:

detecting the first downward force of a depressible button acting as the first solid object via a capacitive sensor of the grid of touch sensitive or force sensitive pressure sensors by detecting a change in capacitance as a surface of the depressible button moves vertically with respect to the capacitive sensor of the customizable universal digital docking input pad.

13. The method of claim 8 further comprising:

simultaneously polling a plurality of capacitive sensors acting as the grid of touch sensitive or force sensitive pressure sensors to detect presence of the information handling system placed on the customizable universal digital docking input pad to trigger establishing the short distance wireless link.

14. The method of claim 8 further comprising:

receiving, via the short distance radio, from the information handling system a user-selected identification of a second type of IO device for the second solid object;

associating a detected second downward force or the second movement of the second solid object with second IO commands formatted for the second type of IO device, via the microprocessor; and transmitting, via the short distance radio, the second IO commands to the information handling system.

15. An information handling system executing a universal docking input pad customization system comprising:

a short distance radio to establish a first short distance wireless link with a customizable universal digital docking input pad placed beneath or within short distance radio range of the information handling system;

the short distance radio to receive from the customizable universal digital docking input pad a location of a solid object placed by a user on the customizable universal digital docking input pad as an identified IO device for the information handling system;

a hardware processor to execute machine readable code instructions of the universal docking input pad customization system to prompt the user via a graphical user interface (GUI) to identify or confirm an IO device type as the identified IO device for the solid object indicating a type of IO commands to be generated at the customizable universal digital docking input pad in response to detected force or movement of the solid object;

the short distance radio to receive first IO commands for the IO device type from the customizable universal digital docking input pad at the location for the identified IO device; and the hardware processor or a hardware controller to execute the first IO commands from the identified IO device to allow the user to interact with a software application of the information handling system.

16. The information handling system of claim 15, wherein the customizable universal digital docking input pad is a capacitive touch pad.

17. The information handling system of claim 15, wherein the customizable universal digital docking input pad includes a grid of resistive touch sensors.

18. The information handling system of claim 15, wherein the first short distance wireless link adheres to the Bluetooth® (BT) communication protocol and is triggered by detection of the information handling system detected by a grid of touch sensitive or force sensitive pressure sensors receiving downward force on the customizable universal digital docking input pad by the information handling system.

19. The information handling system of claim 15 further comprising:

the short distance radio to receive from the customizable universal digital docking input pad a form factor shape of the solid object detected by a grid of sensors of the customizable universal digital docking input pad; and the hardware processor to execute machine readable code instructions of the universal docking input pad customization system to suggest the IO device type for the solid object based on the form factor shape.

20. The information handling system of claim 15 further comprising:

the hardware processor to execute machine readable code instructions of the universal docking input pad customization system to display to the user via a graphical user interface a location for an open or free space on the customizable universal digital docking input pad for a drawing or touch canvas area outside of the detected location of the solid object or a detected location of the information handling system upon on the customizable universal digital docking input pad.

* * * * *